(12) United States Patent
Yajima et al.

(10) Patent No.: US 9,071,420 B2
(45) Date of Patent: Jun. 30, 2015

(54) INFORMATION PROCESSING APPARATUS, TAMPERING DETECTION APPARATUS, INFORMATION PROCESSING METHOD, TAMPERING DETECTION METHOD, AND COMPUTER PRODUCT

(71) Applicant: FUJITSU LIMITED, Kawasaki-shi, Kanagawa (JP)

(72) Inventors: Jun Yajima, Kawasaki (JP); Tetsuya Izu, Ichikawa (JP); Masahiko Takenaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 14 days.

(21) Appl. No.: 14/032,513

(22) Filed: Sep. 20, 2013

(65) Prior Publication Data

US 2014/0169555 A1 Jun. 19, 2014

Related U.S. Application Data

(63) Continuation of application No. PCT/JP2011/057480, filed on Mar. 25, 2011.

(51) Int. Cl.
*G06F 21/00* (2013.01)
*H04L 9/08* (2006.01)
*H04L 9/06* (2006.01)

(52) U.S. Cl.
CPC ............ *H04L 9/0819* (2013.01); *H04L 9/0618* (2013.01); *H04L 2209/34* (2013.01)

(58) Field of Classification Search
CPC .................................................... H04L 9/0618
USPC ......................................................... 713/160
See application file for complete search history.

(56) References Cited

U.S. PATENT DOCUMENTS 5,724,391 A * 3/1998 Takeuchi et al. ............... 375/240
2001/0046292 A1 * 11/2001 Gligor et al. .................... 380/37
(Continued)

FOREIGN PATENT DOCUMENTS

JP 09-046321 2/1997
JP 09-146785 6/1997
(Continued)

OTHER PUBLICATIONS

International Search Report mailed Apr. 19, 2011 in corresponding International Application No. PCT/JP2011/057480.
(Continued)

*Primary Examiner* — Morshed Mehedi
(74) *Attorney, Agent, or Firm* — Staas & Halsey LLP

(57) ABSTRACT

An information processing apparatus includes a processor configured to identify a data length that is longer than a data length of plain text data and that is a multiple of a predetermined block length; calculate a data length difference of the data length of the plain text and the data length; generate a first code that indicates the calculated data length difference; generate a second code that is calculated from the plain text data and is of a data length that is within a remaining data length acquired by subtracting a data length of the generated first code from the data length difference; create padding that includes the generated second code, has the first code at an end, and is of a length equivalent to the data length difference; concatenate the created padding to an end of the plain text data to generate concatenated data; and output the concatenated data.

19 Claims, 13 Drawing Sheets

(56) References Cited

U.S. PATENT DOCUMENTS

| | | | |
|---|---|---|---|
| 2002/0048364 A1* | 4/2002 | Gligor et al. | 380/37 |
| 2003/0058143 A1* | 3/2003 | Chiba et al. | 341/67 |
| 2006/0177054 A1* | 8/2006 | Ohno | 380/37 |
| 2008/0219435 A1* | 9/2008 | Kodama et al. | 380/28 |
| 2009/0113270 A1* | 4/2009 | Orio et al. | 714/752 |
| 2011/0302418 A1* | 12/2011 | Fujisaki | 713/179 |

FOREIGN PATENT DOCUMENTS

| | | |
|---|---|---|
| JP | 2001-318600 | 11/2001 |
| JP | 2004-134839 | 4/2004 |
| JP | 2006-220747 | 8/2006 |
| JP | 2008-219746 | 9/2008 |
| JP | 2009-111563 | 5/2009 |

OTHER PUBLICATIONS

Japanese Office Action mailed Jun. 3, 2014 in corresponding Japanese Patent Application No. 2013-506884.

PCT International Preliminary Report on Patentability mailed Oct. 10, 2013 in corresponding International Application No. PCT/JP2011/057480.

* cited by examiner

INFORMATION PROCESSING APPARATUS, TAMPERING DETECTION APPARATUS, INFORMATION PROCESSING METHOD, TAMPERING DETECTION METHOD, AND COMPUTER PRODUCT

CROSS REFERENCE TO RELATED APPLICATIONS

This application is a continuation application of International Application PCT/JP2011/057480, filed on Mar. 25, 2011 and designating the U.S., the entire contents of which are incorporated herein by reference.

FIELD

The embodiment discussed herein is related to an information processing apparatus, a tampering detection apparatus, an information processing method, a tampering detection method, and a computer product that use block cipher.

BACKGROUND

In the information society of today, ensuring safe handling of information is important. To ensure the security of information, encryption technology for keeping information confidential and technology for detecting tampering of information are required.

Encryption technology includes encryption using a common key system (hereinafter referred to as common key encryption) and encryption using a public key system (hereinafter referred to as public key encryption). The common key encryption advantageously has faster processing speed and enables compact implementation as compared to the public key encryption. Therefore, the common key encryption is used when an encryption function is added to small devices such as portable telephones and IC cards.

In block cipher, which is one type of common key encryption, data to be encrypted (hereinafter referred to as "plain text") is divided into block units for encryption. Since the encryption is performed on the basis of a block unit, the data length of plain text must be a multiple of the data length of a block (hereinafter referred to as a "block length").

Therefore, according to one technique, if the data length of plain text is not a multiple of the block length, padding is concatenated to the plain text to thereby process the plain text into a data length that is a multiple of the block length. The padding to be concatenated includes information necessary for removing the padding at the time of decryption. For example, the padding includes information indicating the data length of the padding (hereinafter referred to as a "padding length").

A technique of detecting tampering of information includes, for example, a technique of determining whether the contents of padding in plain text decrypted from a series of blocks encrypted for each block length (hereinafter referred to as "encrypted blocks") conform to a padding rule. As a result, if the contents of the padding in decrypted plain text have changed consequent to tampering of the encrypted blocks, the padding violates the padding rule and therefore, the tampering can be detected.

In a technique of detecting tampering of information, for example, a CRC for identifying plain text is concatenated to the plain text at the time of encryption. The plain text concatenated with the CRC is processed into a data length that is a multiple of the block length by further concatenating padding before encryption. At the time of decryption, a CRC for identifying decrypted plain text is compared with the CRC added to the decrypted plain text in this technique. As a result, if the plain text has changed consequent to tampering of the encrypted blocks, the CRC of the decrypted plain text is different from the CRC added to the decrypted plain text and therefore, the tampering can be detected (see, e.g., Japanese Laid-Open Patent Publication No. 2006-220747).

However, the technique of detecting tampering based on the padding rule has a problem in that, if a block other than a block to which padding is added, i.e., the last block of encrypted text, is subject to tampering, the tampering cannot be detected.

The technique according to Japanese Laid-Open Patent Publication No. 2006-220747 can be used only for a fixed plain text data length and gives no consideration to a case of an arbitrary data length and, if the technique is used for an arbitrary data length, a CRC must newly be concatenated and a data amount is problematically increased. Therefore, it is problematic that the technique according to Japanese Laid-Open Patent Publication No. 2006-220747 is not applicable in an embedded environment with tight resources since an area for concatenating a CRC cannot be prepared.

SUMMARY

According to an aspect of an embodiment, an information processing apparatus includes a processor configured to: identify a data length that is longer than a data length of plain text data and that is a multiple of a predetermined block length; calculate a data length difference of the data length of the plain text and the identified data length; generate a first code that indicates the calculated data length difference; generate a second code that is calculated from the plain text data and is of a data length that is within a remaining data length acquired by subtracting a data length of the generated first code from the data length difference; create padding that includes the generated second code, has the first code at an end, and is of a length equivalent to the data length difference; concatenate the created padding to an end of the plain text data to generate concatenated data; and output the concatenated data.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

An embodiment of an information processing apparatus, a tampering detection apparatus, an information processing method, a tampering detection method, an information processing program, and a tampering detection program will be described in detail with reference to the accompanying drawings. In the following description, it is assumed that the information processing apparatus is different from the tampering detection apparatus for simplicity of description. However, the information processing apparatus may also have the function of the tampering detection apparatus and the tampering detection apparatus may also have the function of the information processing apparatus.

Figure 1:
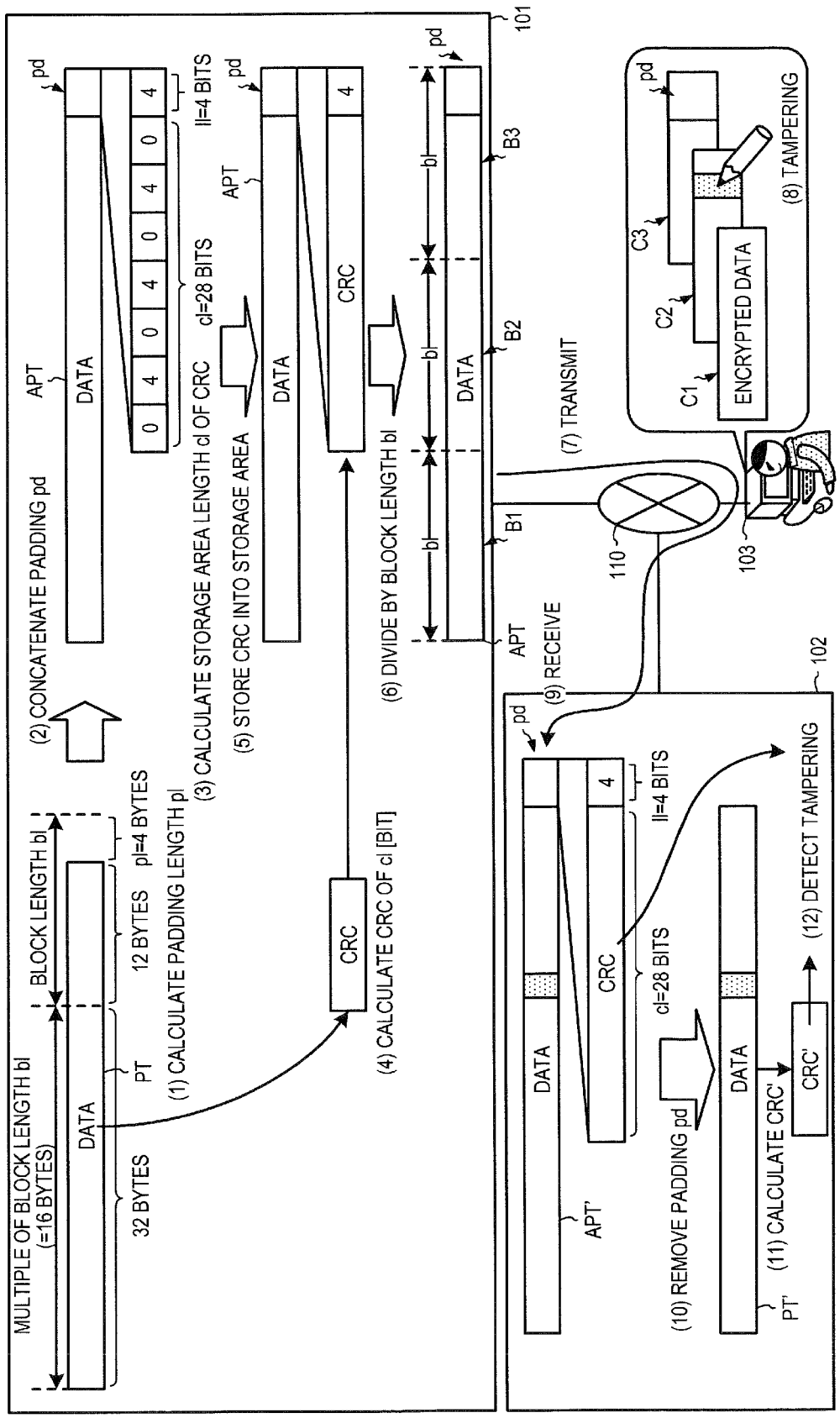
FIG. 1 is an explanatory view of an example of tampering detection.

FIG. 1 is an explanatory view of an example of tampering detection. In FIG. 1, an information processing apparatus 101 is an apparatus on the side of encrypting and transmitting plain text PT. A tampering detection apparatus 102 is an apparatus that receives encrypted plain text PT and detects the presence or absence of tampering in the encrypted plain text PT.

The information processing apparatus 101 and the tampering detection apparatus 102 are connected to a network 110. An attacker's computer 103 is connected to the network 110. The information processing apparatus 101 and the tampering detection apparatus 102 have an encryption key (hereinafter referred to as a "common key") that can be used for encryption and decryption.

The information processing apparatus 101 encrypts the plain text PT by block cipher using the common key. In the block cipher, the information processing apparatus 101 must concatenate padding pd to the plain text PT that is to be encrypted so as to process the plain text PT into a data length that can be divided into block units (i.e., a data length that is a multiple of a block length bl). The plain text PT concatenated with the padding pd will hereinafter be referred to as a "concatenated text APT".

The padding pd concatenated to the plain text PT includes a data length pl of the padding pd (hereinafter referred to as a "padding length") necessary for removing the padding pd at the tampering detection apparatus 102. The padding pd concatenated to the plain text PT includes data used for detection of tampering in the tampering detection apparatus 102.

The tampering detection apparatus 102 decrypts blocks that are received via the network 110 and have been encrypted by block cipher using the common key. The tampering detection apparatus 102 detects the presence or absence of tampering based on the decrypted data.

Details of detection of tampering in the tampering detection apparatus 102 will be described hereinafter by taking, as an example, a case where the information processing apparatus 101 encrypts and transmits to the tampering detection apparatus 102, plain text PT having a data length of 44 [bytes]. However, it is assumed that the block length bl is 16 [bytes].

(1) The information processing apparatus 101 checks the data length of the plain text PT that is to be transmitted and calculates the padding length pl of the padding pd to be concatenated to the plain text PT. For example, since the plain text PT has a data length of 44 [bytes], the data length is short of 48 [bytes] (i.e., triple data length of the block length bl=16 [bytes]) by 4 [bytes]. Therefore, the information processing apparatus 101 calculates the padding length pl as 4 [bytes].

(2) The information processing apparatus 101 processes the plain text PT into a concatenated text APT having a data length of 48 [bytes], which is three times longer than the block length bl=16 [bytes], for encryption by block cipher. For example, the information processing apparatus 101 concatenates the padding pd of the calculated padding length pl=4 [bytes] to the end of the plain text PT to create the concatenated text APT having a data length equal to a multiple of the block length bl.

In the padding pd, the information of the padding length pl of the padding pd necessary for the tampering detection apparatus 102 to remove the padding pd is stored in an area at the end of the padding pd.

The area at the end of the padding pd storing the information of the padding length pl (hereinafter referred as a "padding length area") has a data length ll (hereinafter referred to as a "padding length area length ll") that is a fixed length and that is a data length capable of indicting the longest padding length pl capable of being concatenated to the plain text PT. For example, if the block length is 16 [bytes], the maximum length of the padding pd capable of being concatenated to the plain text PT is 16 [bytes] and therefore, the padding length area length ll is 4 [bits], which can indicate 16.

For example, "04040404" is employed as the padding pd in this case based on the padding method described in pkcs#7. However, "04040404" is in hexadecimal. As a result, the tampering detection apparatus 102 can determine that the padding length pl is 4 [bytes] by reference to 4 indicated by the padding length area corresponding to the last 4 [bits] of the padding pd.

(3) The information processing apparatus 101 calculates a data length cl (hereinafter referred to as "storage area length") of an area (hereinafter referred to as a "storage area") in the padding pd storing a code calculated from the plain text PT. For example, a CRC of the plain text PT can be employed as the code calculated from the plain text PT.

For example, the information processing apparatus 101 defines an area in the padding pd exclusive of the padding length area as the storage area of the CRC. Therefore, the storage area length cl is 28 [bits] obtained by subtracting the padding length area length ll=4 [bits] from the padding length pl=4 [bytes].

(4) The information processing apparatus 101 calculates from the plain text PT, a CRC having a data length that is the same as the calculated storage area length cl. Therefore, the information processing apparatus 101 calculates a 28 [bit] CRC from the plain text PT.

(5) The information processing apparatus 101 stores the calculated 28 [bit] CRC into the storage area in the padding pd. As a result, the information processing apparatus 101 processes the padding pd in the concatenated text APT into the padding pd that includes the padding length pl in the padding length area at the end and that includes the calculated CRC in the storage area.

(6) The information processing apparatus 101 divides the concatenated text APT by the block length bl=16 [bytes]. Since the data length of the concatenated text APT is 48 bytes in this example, the concatenated text APT is divided into three blocks. The resulting blocks are referred to as blocks B1 to B3, sequentially from the head block.

(7) The information processing apparatus 101 encrypts by block cipher and transmits the blocks B1 to B3 to the tampering detection apparatus 102. The blocks B1 to B3 encrypted by block cipher are referred to as encrypted blocks C1 to C3, respectively.

(8) It is assumed that the encrypted blocks C1 to C3 transmitted by the information processing apparatus 101 are captured by the attacker's computer 130 and a portion of the encrypted block C2 is subject to tampering.

(9) The tampering detection apparatus 102 receives the encrypted blocks C1 to C3. The tampering detection apparatus 102 decrypts blocks from the received encrypted blocks C1 to C3. The tampering detection apparatus 102 concatenates the decrypted blocks to create a concatenated text APT'.

However, since the encrypted block C2 has been subject to tampering, the concatenated text APT' created by the tampering detection apparatus 102 based on the encrypted block C2 is data different from the concatenated text APT in the information processing apparatus 101.

(10) the tampering detection apparatus 102 refers to 4 indicated by the padding length area at the end of the concatenated text APT' to identify that the padding length pl is 4 [bytes] and removes 4 [bytes] of the padding pd from the end of the concatenated text APT' to create the plain text PT'. However, consequent to the tampering of the encrypted block C2, the plain text PT' created by the tampering detection apparatus 102 is data that is different from the plain text PT at the information processing apparatus 101.

(11) The tampering detection apparatus 102 calculates code that is calculated from the plain text PT' so that the code has the same data length as the storage area length cl. Specifically, the tampering detection apparatus 102 identifies that the storage area length cl is 28 [bits] from the padding length pl=4 [bytes] and the padding length area length ll=4 [bits]. The tampering detection apparatus 102 calculates a 28 [bit] CRC' from the plain text PT'. Since the plain text PT' is data that is different from the plain text PT, the calculated CRC' is data that is different from the CRC at the information processing apparatus 101.

(12) The tampering detection apparatus 102 extracts the CRC of the plain text PT from the identified storage area of 28 [bits]. The tampering detection apparatus 102 determines whether the calculated CRC' and the CRC extracted from the padding pd coincide. The tampering detection apparatus 102 outputs a determination result.

Specifically, if the CRC' and the CRC are data that are different from each other, the tampering detection apparatus 102 can determine that the plain text PT' is data that is different from the plain text PT at the information processing apparatus 101, and outputs that tampering has occurred. If the CRC' and the CRC are the same data, the tampering detection apparatus 102 can determine that the plain text PT' has not changed from the plain text PT at the information processing apparatus 101, and outputs that no tampering has occurred.

As described above, the information processing apparatus 101 stores the code calculated from the plain text PT into the padding pd. The tampering detection apparatus 102 determines whether the code calculated from the entire decrypted plain text PT' and the code calculated from the plain text PT stored in the padding pd coincide. As a result, the tampering detection apparatus 102 can detect tampering regardless of which portion of the plain text PT is changed by the tampering.

The information processing apparatus 101 calculates the padding length pl of the padding to be concatenated to the plain text PT before calculating the storage area length cl of the code calculated from the plain text PT to be within a range of the calculated padding length pl. The information processing apparatus 101 creates the code calculated from the plain text PT such that the code has a length equal to or less than the same data length as the calculated storage area length cl, and stores the code into the storage area. As a result, the data length of the concatenated text APT can be prevented from increasing and the amount of resources used can be reduced.

The information processing apparatus 101 ensures the padding length area when calculating the storage area. As a result, based on the data length indicated by the code of the padding length area at the end, the tampering detection apparatus 102 can remove the padding pd from the concatenated text APT for which no tampering is detected, and acquire plain text PT that is the same as the plain text PT at the information processing apparatus 101.

Figure 2:
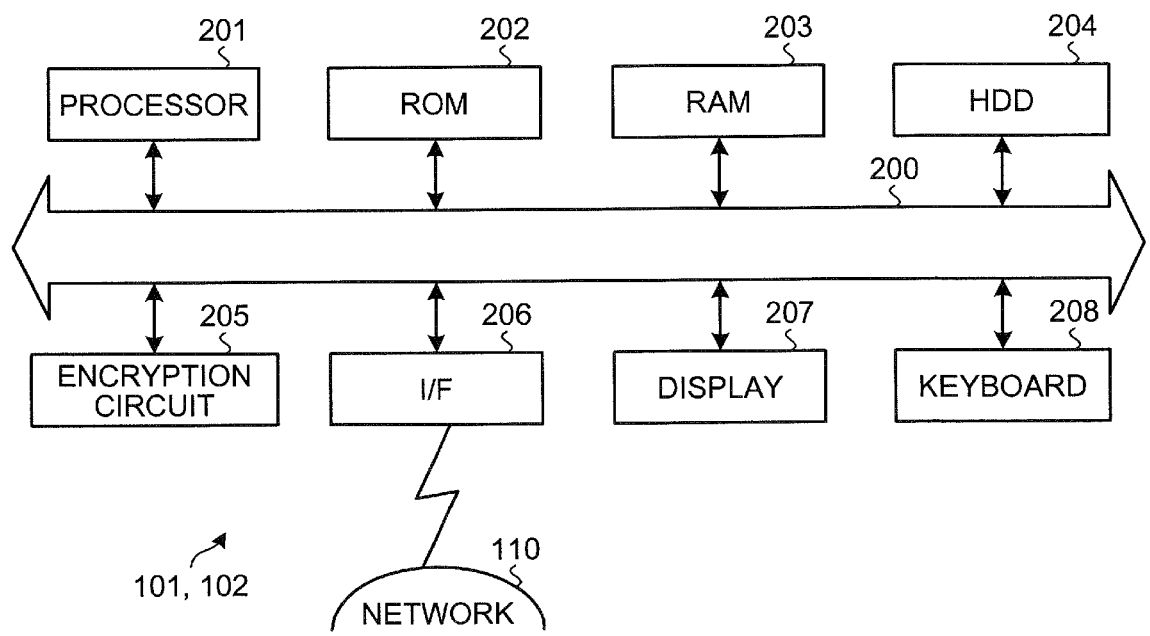
FIG. 2 is a block diagram of a hardware configuration of an information processing apparatus 101 or a tampering detection apparatus 102 according to an embodiment.

FIG. 2 is a block diagram of a hardware configuration of the information processing apparatus 101 or the tampering detection apparatus 102 according to the embodiment. In the present embodiment, the information processing apparatus 101 and the tampering detection apparatus 102 have the same hardware configuration.

As depicted in FIG. 2, the information processing apparatus 101 or the tampering detection apparatus 102 includes a central processing unit (CPU) 201, read-only memory (ROM) 202, random access memory (RAM) 203, a hard disk drive (HDD) 204, an encryption circuit 205, an interface (I/F) 206, a display 207, and a keyboard 208, respectively connected by a bus 200.

The CPU 201 governs overall control of the information processing apparatus 101 or the tampering detection apparatus 102. The ROM 202 stores programs such as a boot program. The ROM 202 further stores an application programming interface (API). The RAM 203 is used as a work area of the CPU 201. The HDD 204 is a driver device that, under the control of the CPU 201, controls the reading and writing of data with respect to an internal hard disk. The encryption circuit 205 encrypts and decrypts data.

The I/F 206 is connected to the network 110 such as a local area network (LAN), a wide area network (WAN), and the Internet through a communication line and is connected to other apparatuses through the network 110. The I/F 206 administers an internal interface with the network 110 and controls the input and output of data with respect to external apparatuses. For example, a modem or a LAN adaptor may be employed as the I/F 206.

The display 207 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 207. The keyboard 208 includes, for example, keys for inputting letters, numerals, and various instructions and performs the input of data. Alternatively, a touch-panel-type input pad or numeric keypad, etc. may be adopted. Nonetheless, configuration is not limited hereto and may omit the HDD 204, the encryption circuit 205, and the keyboard 208.

Functions of the information processing apparatus 101 and the tampering detection apparatus 102 will be described with reference to FIGS. 3 and 4. However, a single apparatus may have both the function of the information processing apparatus 101 and the function of the tampering detection apparatus 102.

An example of a functional configuration of the information processing apparatus 101 will be described with reference to FIG. 3.

Figure 3:
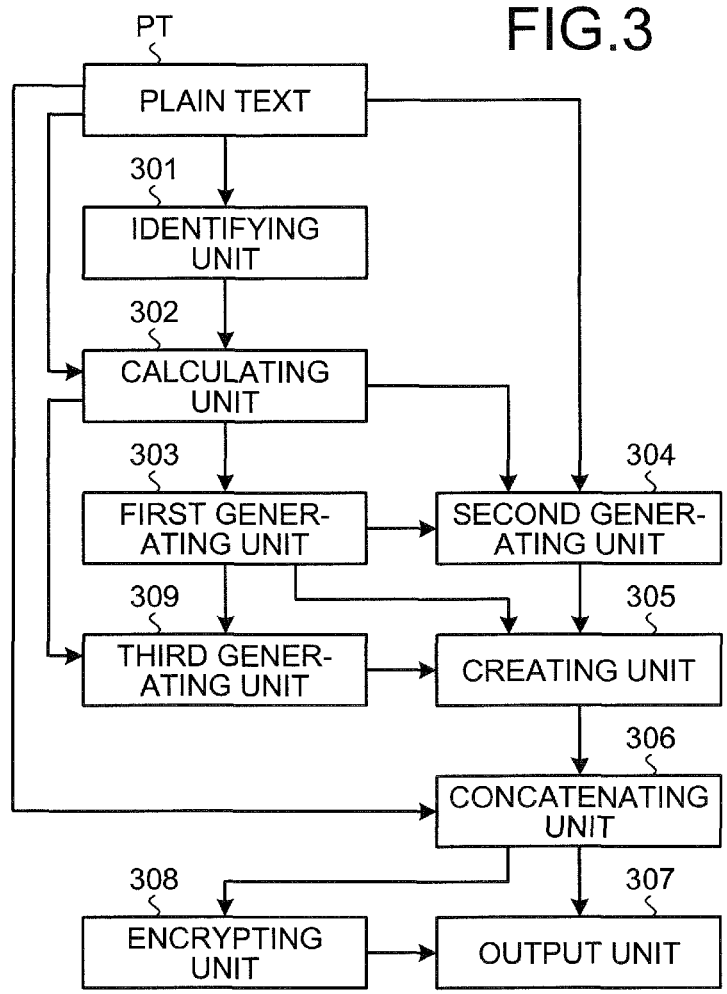
FIG. 3 is a block diagram of a functional configuration of the information processing apparatus 101.

FIG. 3 is a block diagram of a functional configuration of the information processing apparatus 101. The information processing apparatus 101 has a configuration that includes an identifying unit 301, a calculating unit 302, a first generating unit 303, a second generating unit 304, a creating unit 305, a concatenating unit 306, an output unit 307, an encrypting unit 308, and a third generating unit 309. For example, functions acting as a control unit (the identifying unit 301 to the encrypting unit 308) are implemented by causing the CPU 201 to execute a program stored in a storage device such as the ROM 202 and the RAM 203 depicted in FIG. 2 or by the I/F 206. Data processed by the functional units is stored to a storage device such as the RAM 203.

The identifying unit 301 has a function of identifying a data length that is longer than the data length of plain text data and that is a multiple of a predetermined block length bl. Plain text data is data that is to be encrypted by block cipher and corresponds to the plain text PT described above. The predetermined block length bl is the data length of one block serving as a unit of division prescribed by block cipher and is the block length bl=16 [bytes] described above, for example.

For example, the identifying unit 301 identifies the shortest data length among a group of data lengths that are longer than the data length of the plain text data and that are multiples of the predetermined block length bl. Thus, the identifying unit 301 determines how many blocks the plain text PT must be divided into at minimum to enable encryption, and calculates a data length in the case of the smallest block number required for encryption. For example, when the block length bl is 16 [bytes] and the plain text PT has 44 [bytes], the identifying unit 301 identifies a data length of 48 [bytes], which is three times longer than the block length bl, because encryption can be performed if the plain text PT is divided into three blocks at minimum.

As a result, the identifying unit 301 can identify a data length that is a multiple of the block length bl as the data length of the concatenated text APT based on how many blocks the plain text PT must be divided into at minimum to enable the block encryption. Since the identifying unit 301 identifies the data length of the concatenated text APT, a limitation can be imposed on the data length of the concatenated text APT to be created.

The calculating unit 302 has a function of calculating a data length difference of the data length of the plain text data and the data length identified by the identifying unit 301. The data length difference is a data length used as the padding length pl. For example, when the plain text PT has 44 [bytes] and the data length identified by the identifying unit 301 is 48 [bytes], the calculating unit 302 calculates the data length difference of 4 [bytes] used as the padding length pl. As a result, the calculating unit 302 can calculate the padding length pl.

The first generating unit 303 has a function of generating a first code indicating the differential data length calculated by the calculating unit 302. The first code is a binary code indicating the data length difference.

For example, the first generating unit 303 generates the first code, which indicates the data length difference, such that the first code has the shortest data length capable of indicating the predetermined block length bl. The shortest data length capable of indicating the predetermined block length bl is the shortest data length necessary for indicating the block length bl that is the longest data length usable as the padding length pl.

For example, when the block length bl is 16 [bytes] and the data length difference is 4 [bytes], the first generating unit 303 uses the shortest data length of 4 [bits] capable of indicating 16 to create the first code indicating the data length difference of 4 [bytes]. Therefore, the first generating unit 303 generates the code 4 (in hexadecimal; "0100" in binary) indicating the data length difference of 4 [bytes].

As a result, the first generating unit 303 can generate code indicating the padding length pl necessary for removing the padding pd in the tampering detection apparatus 102.

The second generating unit 304 has a function of generating a second code that is calculated based on plain text data and is of a data length that is within a remaining data length acquired by subtracting the data length of the first code generated by the first generating unit 303 from the data length difference. The second code is a code calculated from the plain text PT and is, for example, a cyclic redundancy check code (CRC) calculated by a cyclic redundancy check code generation function, or a hash value calculated by a hash function from the plain text PT, or parity code calculated from the plain text PT. The data length of the first code is the padding length area length ll described above.

For example, the second generating unit 304 has a function of generating the second code that is calculated from the plain text data and is of the remaining data length, which is acquired by subtracting the data length of the first code from the data length difference. For example, when the padding length pl is 4 [bytes] and the padding length area length ll is 4 [bits], the remaining data length is 28 [bits] and therefore, the second generating unit 304 uses 28 [bits] to generate a CRC from the plain text PT.

For example, an API stored in the ROM 202 is used in calculation of the CRC. Multiple APIs calculating respective CRCs of multiple data lengths may be stored in the ROM 202 and the APIs may selectively be used for calculating the CRC depending on the data length of the CRC to be calculated. The ROM 202 may store alone an API that calculates the CRC of the longest data length among calculable CRCs and a portion of the calculated CRC may be extracted depending on the data length necessary.

As a result, the second generating unit 304 can generate code that is calculated from the plain text PT and used as an index for detection of tampering in the tampering detection apparatus 102 such that the code has the storage area length cl.

The creating unit 305 has a function of creating padding that includes the second code generated by the second generating unit 304, has the first code at the tail end and is of a length equivalent to the data length difference. For example, the creating unit 305 creates padding having the first code at the tail end and the second code at the head.

For example, the creating unit 305 creates padding ending with the first code and starting with the second code. For example, the creating unit 305 creates the padding pd ending with the code indicating the padding length pl and starting with the CRC calculated from the plain text PT such that the padding pd has the calculated padding length pl. When the padding length pl is 7 [bytes] and the CRC is 32-bit "63350373", the padding pd is 7-byte "63350373070707" ending with "7" indicating the padding length pl and starting with "63350373". The padding pd is in hexadecimal.

When the padding length pl is 4 [bytes] and the CRC is 28-bit "3F459A1", the padding pd is "3F459A14" having a data length of 4 [bytes] ending with "4" indicating the padding length pl and starting with "3F459A1". The padding pd is in hexadecimal.

For example, the creating unit 305 creates padding of the data length difference and having the first code at the end and the second code made adjacent to the beginning of the first code. For example, the creating unit 305 creates the padding pd having the code indicating the padding length pl at the end and the CRC calculated from the plain text PT made adjacent to the beginning of the code indicating the padding length pl such that the padding pd has the calculated padding length pl. It is assumed that the padding length pl is 7 [bytes] and that the CRC is 32-bit "63350373". In this case, the padding pd is 7-byte "07070633503737" having "7" indicating the padding length pl at the end and "63350373" made adjacent to the beginning of the code indicating the padding length pl. The padding pd is in hexadecimal.

The creating unit 305 may store code corresponding to the padding length pl and generated by the third generating unit 309 into an area other than the padding length area and the storage area.

As a result, the creating unit 305 can create the padding pd to include the padding length necessary for removing the padding pd in the tampering detection apparatus 102 and the code calculated from the plain text PT used as an index for detection of tampering. The creating unit 305 can further create padding that includes the code generated by the third generating unit 309 and used as an index for determining whether the padding length pl is correct at the tampering detection apparatus 102.

The concatenating unit 306 has a function of concatenating the padding created by the creating unit 305 to the tail end of the plain text data to generate concatenated data. The concatenated data corresponds to the concatenated text APT described above. For example, the concatenating unit 306 concatenates the padding pd to the end of the plain text PT to generate the concatenated text APT of a data length that is a multiple of the block length bl. As a result, the concatenating unit 306 can create concatenated text APT having a data length that is a multiple of the block length bl and capable of being encrypted by block cipher.

The output unit 307 has a function of outputting the concatenated data acquired by the concatenating unit 306. For example, the output unit 307 causes the I/F 206 to transmit the concatenated text APT via the network 110 to another apparatus. The output unit 307 outputs the concatenated text APT via an optical disk drive to an optical disk.

The output unit 307 has a function of outputting encrypted concatenated data that has been encrypted by the encrypting unit 308 on the basis of the predetermined block length bl. The encrypted concatenated data corresponds to one encrypted block or a series of encrypted blocks generated by encrypting the concatenated text APT on the basis of the block length bl.

For example, the output unit 307 causes the I/F 206 to transmit the encrypted blocks generated by encrypting the concatenated text APT on the basis of the block length bl, via the network 110, to the tampering detection apparatus 102. If an initial vector IV is used at the time of encryption by the encrypting unit 308, the initial vector IV is transmitted along with the encrypted blocks. The initial vector IV need not be confidential information and may be transmitted without encryption. The output unit 307 outputs the encrypted blocks generated by encrypting the concatenated text APT on the basis of the block length bl, via an optical disk drive, to an optical disk.

The encrypting unit 308 has a function of encrypting on the basis of the predetermined block length bl, the concatenated data by using a key used for encryption and decryption in common. The key used for encryption and decryption in common is a common key. For example, the encrypting unit 308 divides the concatenated text APT by the block length bl followed by encryption by block cipher using the common key to generate the encrypted blocks.

For example, the encrypting unit 308 uses the encryption circuit 205 of the Data Encryption Standard (DES) method or the Advanced Encryption Standard (AES) method for the encryption. The DES method uses the block length bl=8 [bytes] and the AES method uses the block length bl=16 [bytes]. Multiple operation modes are prescribed in each of the encryption methods and specific encryption and decryption processes are executed depending on these operation modes.

The operation modes usable in both the DES method and the AES method include the Electronic Codebook (ECB) mode, the Cipher Block Chaining (CBC) mode, the Cipher Feedback (CFB) mode, the Output Feedback (OFB) mode, and the Counter (CTR) mode. For the initial vector IV used for the encryption, for example, random numbers generated for each encryption can be employed.

As a result, the encrypting unit 308 can encrypt on the basis of the block length bl, the concatenated text APT by block cipher using the common key to ensure confidentiality of the concatenated text APT.

The third generating unit 309 has a function of generating a third code that identifies the first code and is of a remaining data length acquired by subtracting the data length of the first code and a predetermined data length from the data length difference. The third code is a code corresponding to the padding length pl.

For example, the third generating unit 309 generates a code having a data length of a remaining area that is extracted from the beginning of a code acquired by sequentially arranging one-byte codes indicating the padding length. As a result, the third generating unit 309 can generate the code used as an index for determining whether the padding length pl is correct at the tampering detection apparatus 102.

A functional configuration example of the tampering detection apparatus 102 will be described with reference to FIG. 4.

Figure 4:
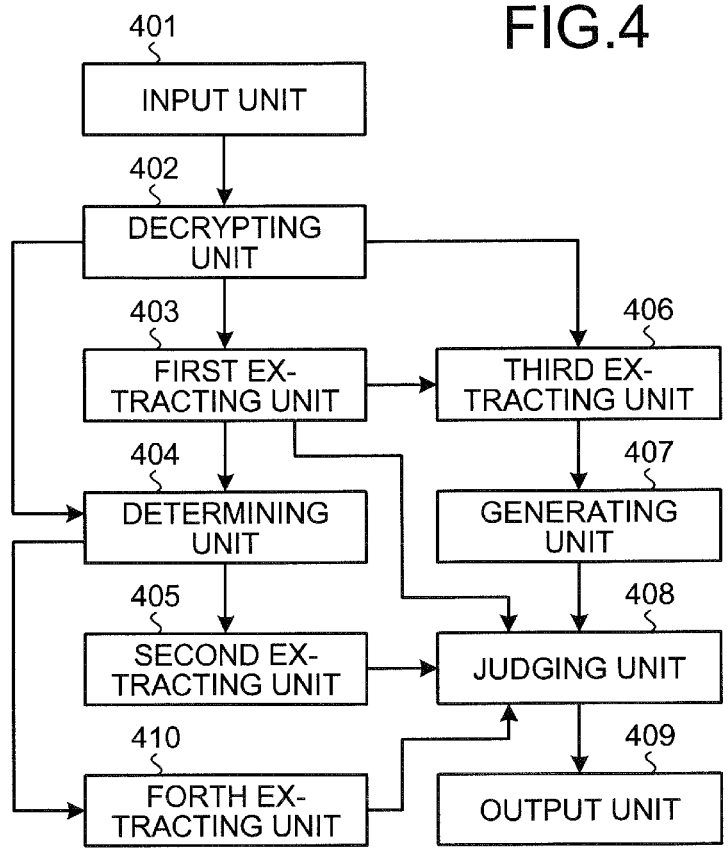
FIG. 4 is a block diagram of a functional configuration of the tampering detection apparatus 102.

FIG. 4 is a block diagram of a functional configuration of the tampering detection apparatus 102. The tampering detection apparatus 102 has a configuration that includes an input unit 401, a decrypting unit 402, a first extracting unit 403, a determining unit 404, a second extracting unit 405, a third extracting unit 406, a generating unit 407, a judging unit 408, and an output unit 409. For example, functions acting as a control unit (the input unit 401 to the output unit 409) are implemented by causing the CPU 201 to execute a program stored in a storage device such as the ROM 202 and the RAM 203 depicted in FIG. 2 or by the I/F 206. Data processed by the functional units is stored to a storage device such as the RAM 203.

The input unit 401 has a function of inputting encrypted data acquired by encrypting the plain text data on the basis of the predetermined block length bl. The plain text data corresponds to the plain text PT described above. The encrypted data corresponds to the encrypted blocks described above.

For example, the input unit 401 receives the encrypted blocks from the information processing apparatus 101, through the I/F 206, via the network 110. The input unit 401 reads the encrypted blocks from an optical disk, via an optical disk drive. As a result, the input unit 401 can input the encrypted blocks that are to be checked for tampering.

The decrypting unit 402 has a function of generating from the encrypted data input by the input unit 401, decrypted data that is decrypted by using a key that is used for encryption and decryption in common. The key used for encryption and decryption in common is the common key. If decrypted from non-tampered encrypted blocks, the decrypted data is the concatenated text APT of the information processing apparatus 101. However, if decrypted from tampered encrypted blocks, the decrypted data is a concatenated text APT' having contents that differs from the concatenated text APT of the information processing apparatus 101.

For example, the decrypting unit 420 uses the CBC mode of the block cipher using the common key to decrypt the concatenated text APT or the concatenated text APT' from an initial Vector IV and the encrypted blocks. The initial vector IV is the same data as the initial Vector IV used in the encryption by the information processing apparatus 101. As a result, the decrypting unit 420 can decrypt the concatenated text from the encrypted blocks.

The first extracting unit 403 has a function of extracting the first code from a first area at the end of the encrypted data storing the data length of the padding pd. The first area is the padding length area described above. If the encrypted blocks have not been subject to tampering or if the padding pd has not been affected by tampering, the first code is the padding length pl. On the other hand, if the padding pd has been affected by tampering, the first code is a meaningless code.

For example, the first extracting unit 403 refers to the last 4 [bits] of the concatenated text decrypted by the decrypting unit 402 to extract 4 [bytes] presumed to be the padding length pl. As a result, the first extracting unit 403 can extract the data length presumed to be the padding length pl.

The determining unit 404 has a function of determining based on the data length indicated by the first code extracted by the first extracting unit 403, a second area of the decrypted data storing a code calculated from the plain text data. The second area is a storage area of the code calculated from the plain text PT estimated from the padding length pl extracted by the first extracting unit 403.

For example, the determining unit 404 determines, as the second area, an area adjacent to the beginning of the first area and having a remaining data length acquired by subtracting the data length of the first area from the data length indicated by the first code. For example, if the padding length pl is 4 [bytes], the first extracting unit 403 determines an area of 28 [bits] adjacent to the beginning of the padding length area. As a result, the determining unit 404 can determine the area presumed to be the storage area storing the code calculated from the plain text PT by the information processing apparatus 101.

For example, the determining unit 404 determines, as a fourth area, an area in the decrypted data adjacent to the beginning of the second area and having a remaining data length acquired by subtracting the data length of the first code and a predetermined data length from the data length indicated by the first code. As a result, the determining unit 404 can determine the area presumed to be the area having the code corresponding to the padding stored by the information processing apparatus 101.

The second extracting unit 405 has a function of extracting the second code from the second area determined by the determining unit 404. If the encrypted blocks have not been subject to tampering or if the padding pd has not been affected by tampering, the second code is a code (e.g., CRC) calculated from the plain text PT and stored by the information processing apparatus 101. On the other hand, if the padding pd has been affected by tampering, the second code is a meaningless code affected by tampering.

For example, the second extracting unit 405 extracts from the area presumed to be the storage area of the CRC, the CRC stored by the information processing apparatus 101 or a meaningless code affected by tampering. As a result, the second extracting unit 405 can extract the code used as an index for detection of tampering.

The third extracting unit 406 has a function of extracting the third code from a third area of the decrypted data exclusive of an ending area of the decrypted data, of the data length indicated by the first code. The ending area is an area at the end of the concatenated text decrypted by the decrypting unit 402 and, if the encrypted blocks have not been subject to tampering or if the padding pd has not been affected by tampering, the ending area is the padding pd. On the other hand, the ending area is an area at the end of the concatenated text decrypted by the decrypting unit 402 and if the padding pd has been affected by tampering, the ending area is a meaningless area.

For example, the third extracting unit 406 extracts the plain text PT of the information processing apparatus 101, or tampered plain text PT', exclusive of the tail data presumed to be the padding pd. As a result, the third extracting unit 406 can extract the plain text that is to be checked for tampering.

The generating unit 407 has a function of generating a fourth code that identifies the third code extracted by the third extracting unit 406 and is of the same data length as the data length of the second code. The fourth code is a code identifying the third code and is, for example, a hash value (e.g., CRC) calculated by a hash function from the third code or a parity code acquired from the third code.

For example, if the second code is 28 [bits], a 28 [bit] CRC is generated from the third code. As a result, the generating unit 407 can generate a code calculated from the plain text PT of the information processing apparatus 101 or a code calculated from the tampered plain text PT'. The length of the second code may be shared in advance as is the case with the key.

The judging unit 408 has a function of judging whether the fourth code generated by the generating unit 407 and the second code coincide. For example, the judging unit 408 judges whether the CRC calculated from the plain text PT and the CRC stored in the padding pd coincide.

The judging unit 408 judges whether the CRC' calculated from the plain text PT' affected by the tampering of the encrypted blocks and the CRC stored in the padding pd coincide. The judging unit 408 judges whether the CRC' calculated from the plain text PT' affected by the tampering of the encrypted blocks and a CRC" stored in the padding pd affected by the tampering of the encrypted blocks coincide.

As a result, if the plain text extracted by the third extracting unit 406 has not been affected by tampering, coincidence is determined from the coincidence judgment and the judging unit 408 can judge that no tampering has occurred. If the plain text extracted by the third extracting unit 406 has been affected by tampering, non-coincidence is judged from the coincidence judgment and the judging unit 408 can judge that tampering has occurred.

The judging unit 408 has a function of judging whether a code identified by a fifth code extracted by a fourth extracting unit 410 and the first code coincide. For example, the judging unit 408 judges whether the code extracted by the first extracting unit 403 from the code corresponding to the padding length pl stored by the information processing apparatus 101 is the correct code. As a result, if the code is not the correct code, the judging unit 408 can judge that tampering has occurred.

The output unit 409 has a function of outputting a judgment result obtained by the judging unit 408. For example, the output unit 409 outputs to the display 207, indication that the fourth code coincides with the second code, i.e., that the received encrypted blocks have not been subject to tampering. Alternatively, the output unit 409 outputs to the display 207, indication that that the fourth code does not coincide with the second code, i.e., that the received encrypted blocks have been subject to tampering.

As a result, the output unit 409 can output indication whether the received encrypted blocks have been subject to tampering, i.e., whether the plain text extracted by the third extracting unit 406 has been affected by tampering. The output unit 409 outputs the decrypted data of the decryption result to the disk.

The fourth extracting unit 410 has a function of extracting the fifth code from the fourth area storing the code that identifies the first code. For example, the fourth extracting unit 410 extracts a code stored in the area that is determined by the determining unit 404 and is presumed to have the code corresponding to the padding length pl stored by the information processing apparatus 101. As a result, if the padding pd has not been affected by tampering, the fourth extracting unit 410 can extract the code corresponding to the padding length pl stored by the information processing apparatus 101.

A data structure of the concatenated text APT will be described with reference to FIG. 5.

Figure 5:
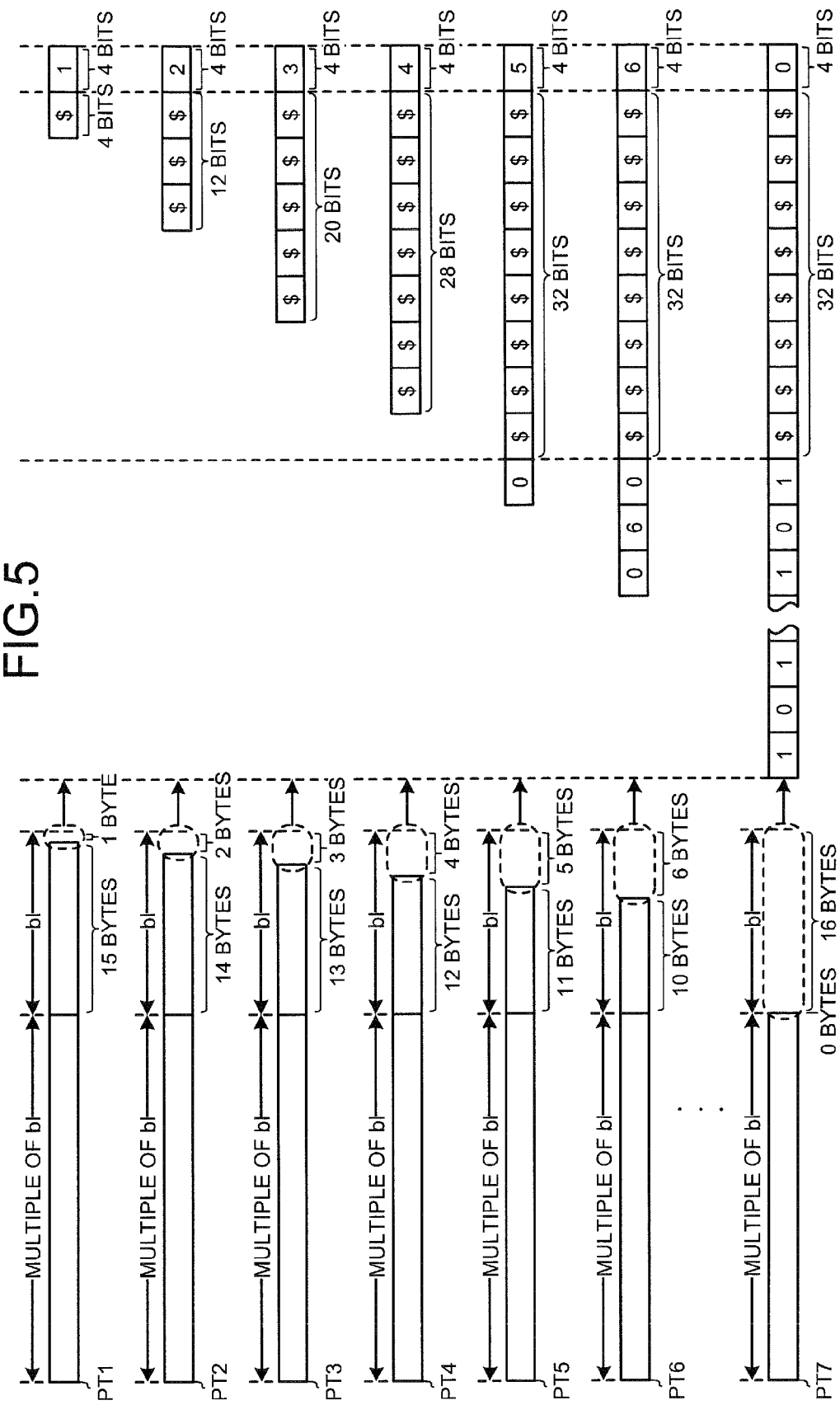
FIG. 5 is an explanatory view of an example of a data structure of concatenated text APT.

FIG. 5 is an explanatory view of an example of a data structure of the concatenated text APT. In this example, plain texts PT1 to PT7 are plain texts PT encrypted by block cipher. It is assumed that the block length bl is 16 [bytes]. The padding pd concatenated to the plain texts PT has a padding length area at the end and includes a CRC storage area.

The CRC storage area is an area adjacent to the beginning of the padding length area. The padding length area length ll has a data length of 4 [bits], i.e., a minimum data length necessary for indicating the block length bl=16 [bytes]. The CRC storage area length cl is up to 32 [bits]. The contents of the padding pd are in hexadecimal. However, the CRC is denoted by "$".

If the padding pd has a remaining area other than the padding length area and the storage area, a code corresponding to the padding length pl is stored in the remaining area. The code corresponding to the padding length pl is a code having the data length of the remaining area extracted from the beginning of a code acquired by sequentially arranging one-byte codes indicating the padding length.

The plain text PT1 is data having a data length 15 [bytes] longer than a multiple of the block length bl. Therefore, 1 [byte] of the padding pd is necessary for encrypting the plain text PT1 by block cipher. The padding pd includes 1 indicating the padding length pl of 1 [byte] in the padding length area that is the last 4 [bits] and includes the CRC acquired from the plain text PT1 in the storage area that is the remaining 4 [bits] adjacent to the beginning of the padding length area.

The plain text PT2 is data having a data length 14 [bytes] longer than a multiple of the block length bl. Therefore, 2 [bytes] of the padding pd are necessary for encrypting the plain text PT2 by block cipher. The padding pd includes 2 indicating the padding length pl of 2 [bytes] in the padding length area that is the last 4 [bits] and includes the CRC acquired from the plain text PT2 in the storage area that is the remaining 12 [bits] adjacent to the beginning of the padding length area.

The plain text PT3 is data having a data length 13 [bytes] longer than a multiple of the block length bl. Therefore, 3 [bytes] of the padding pd are necessary for encrypting the plain text PT3 by block cipher. The padding pd includes 3 indicating the padding length pl of 3 [bytes] in the padding length area that is the last 4 [bits] and includes the CRC acquired from the plain text PT3 in the storage area that is the remaining 20 [bits] adjacent to the beginning of the padding length area.

The plain text PT4 is data having a data length 12 [bytes] longer than a multiple of the block length bl. Therefore, 4 [bytes] of the padding pd are necessary for encrypting the plain text PT4 by block cipher. The padding pd includes 4 indicating the padding length pl of 4 [bytes] in the padding length area that is the last 4 [bits] and includes the CRC acquired from the plain text PT4 in the storage area that is the remaining 28 [bits] adjacent to the beginning of the padding length area.

The plain text PT5 is data having a data length 11 [bytes] longer than a multiple of the block length bl. Therefore, 5 [bytes] of the padding pd are necessary for encrypting the plain text PT5 by block cipher. The padding pd includes 5 indicating the padding length pl of 5 [bytes] in the padding length area that is the last 4 [bits] and includes the CRC acquired from the plain text PT5 in the storage area that is 32 [bits] of the remaining 36 [bits] adjacent to the beginning of the padding length area.

The padding pd includes a code "0" corresponding to the padding length pl=5 [bytes] in the remaining 4 [bits]. The code "0" is the first 4 [bits] of "05050505 . . . " acquired by sequentially arranging one-byte codes indicating the padding length.

The plain text PT6 is data having a data length 10 [bytes] longer than a multiple of the block length bl. Therefore, 6 [bytes] of the padding pd are necessary for encrypting the plain text PT6 by block cipher. The padding pd includes 6 indicating the padding length pl of 6 [bytes] in the padding length area that is the last 4 [bits] and includes the CRC acquired from the plain text PT6 in the storage area that is 32 [bits] of the remaining 44 [bits] adjacent to the beginning of the padding length area.

The padding pd includes a code "060" corresponding to the padding length pl=6 [bytes] in the remaining 12 [bits]. The code "060" is the first 12 [bits] of "06060606 . . . " acquired by sequentially arranging one-byte codes indicating the padding length.

The plain text PT7 is data of a length that is a multiple of the block length bl. However, if the padding pd is not concatenated, information indicating the absence of concatenation of the padding pd must be concatenated to the plain text PT7, resulting in the plain text PT7 having a data length that is not a multiple of the block length bl. Thus, even if the plain text PT7 is data having a length that is a multiple of the block length bl, the padding pd must be concatenated.

Therefore, 16 [bytes] of the padding pd are necessary for encrypting the plain text PT7 by block cipher. The padding pd includes "0" indicating the padding length pl of 16 [bytes] in the padding length area that is the last 4 [bits] and includes the CRC acquired from the plain text PT7 in the storage area that is 32 [bits] of the remaining 124 [bits] adjacent to the beginning of the padding length area.

Further, the padding pd includes in the remaining 92 [bits], a code "10101010101010101010101" corresponding to the padding length pl=16[byte]. The code "10101010101010101010101" is the first 92 [bits] of "1010101010101010101010 . . . " acquired by sequentially arranging one-byte codes indicating the padding length pl.

The storage area may be implemented by employing the first 32 [bits] of the padding pd at maximum. The storage area may be implemented by employing the entire remaining area of the padding pd without setting the threshold value of 32 [bits].

A hash value may be employed as the code calculated from the plain text PT and stored in the storage area. Alternatively, parity may be employed as the code calculated from the plain text PT and stored in the storage area. A hash value or parity may be employed as the code corresponding to the padding length pl.

If a CRC of each data length is calculated, the CRC may be calculated from a CRC calculation function corresponding to each data length. The CRC may be calculated by calculating a CRC for a predetermined data length regardless of the padding length pl and extracting a code having a necessary data length from the beginning. For example, if the padding length pl is 8 [bits], the information processing apparatus 101 calculates a 32 [bit] CRC and extracts and stores the first 4 [bits] of the CRC into the storage area.

A first specific example of tampering detection will be described with reference to FIGS. 6 and 7. In this example, the information processing apparatus 101 uses the CBC mode of the block cipher for encryption. The tampering detection apparatus 102 uses the CBC mode of the block cipher for decryption.

Figure 6:
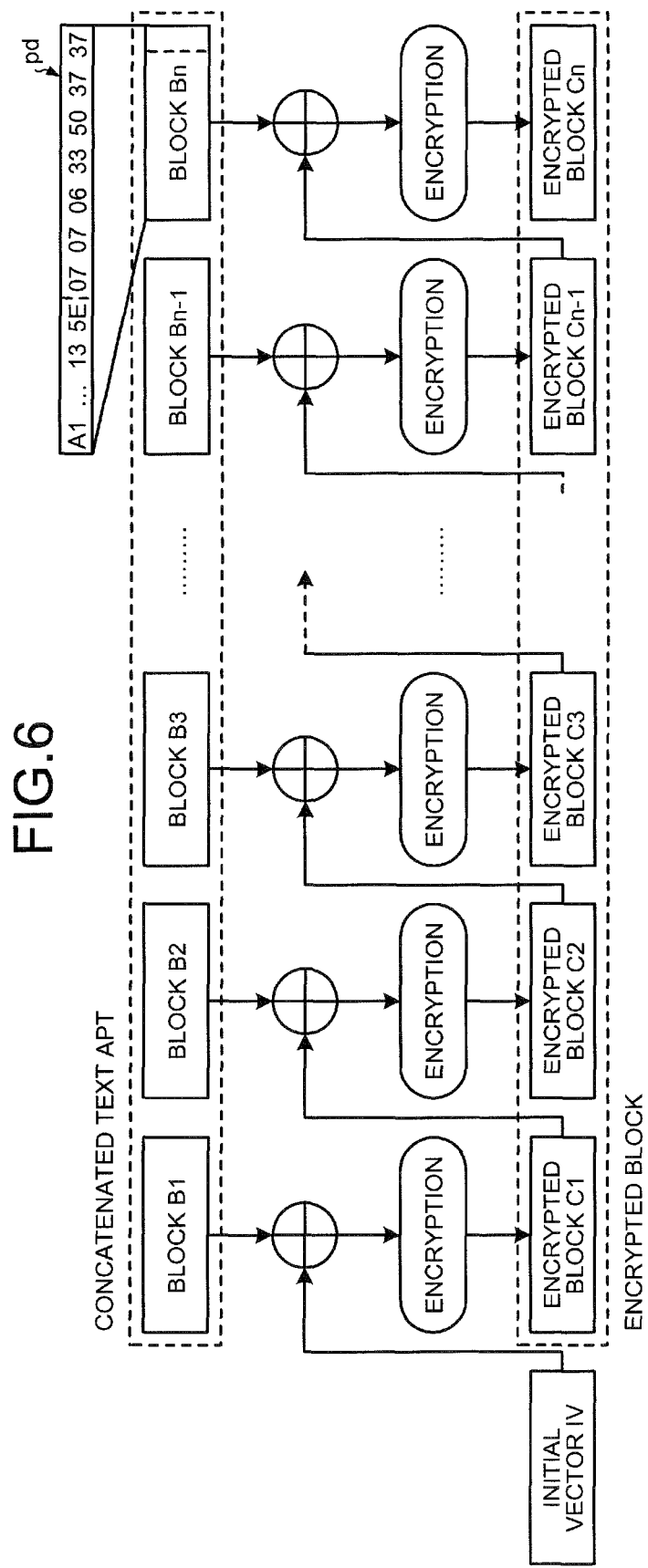
FIG. 6 is an explanatory view of a first specific example of encryption of plain text PT by the information processing apparatus 101.

FIG. 6 is an explanatory view of a first specific example of encryption of the plain text PT by the information processing apparatus 101. In this example, the information processing apparatus 101 encrypts the plain text PT having a data length 9 [bytes] longer than a multiple of the block length bl.

Therefore, the information processing apparatus 101 concatenates to the plain text PT, 7 [bytes] of the padding pd to thereby generate the concatenated text APT for the encryption by block cipher. The information processing apparatus 101 divides the concatenated text APT by the block length bl to generate blocks B1 to Bnk. The information processing apparatus 101 encrypts the blocks B1 to Bn with the CBC mode of the block cipher to generate encrypted blocks C1 to Cn.

For example, the information processing apparatus 101 concatenates to the plain text PT, the padding pd ending with 7 indicating the padding length pl=7 [bytes], including a 32 [bit] CRC "63350373", and having "07070" corresponding to the padding length pl=7 [bytes] as the remainder.

The information processing apparatus 101 divides the concatenated text APT concatenated with the padding pd by the block length bl to generate the blocks B1 to Bn. The generated block Bn includes the padding pd.

The information processing apparatus 101 encrypts each of the generated blocks B1 to Bn to generate the encrypted blocks C1 to Cn. For example, if encrypting the first block B1 from the beginning, the information processing apparatus 101 calculates exclusive-OR between the block B1 and the initial vector IV and performs encryption with the common key to generate the encrypted block C1. If encrypting the i-th block Bi from the beginning, the information processing apparatus 101 calculates exclusive-OR between the block Bi and the encrypted block Ci-1 and performs encryption with the common key to generate the encrypted block Ci.

The information processing apparatus 101 transmits the generated encrypted blocks C1 to Cn to the tampering detection apparatus 102. The tampering detection by the tampering detection apparatus 102 upon receiving the transmitted encrypted blocks C1 to Cn will be described.

Figure 7:
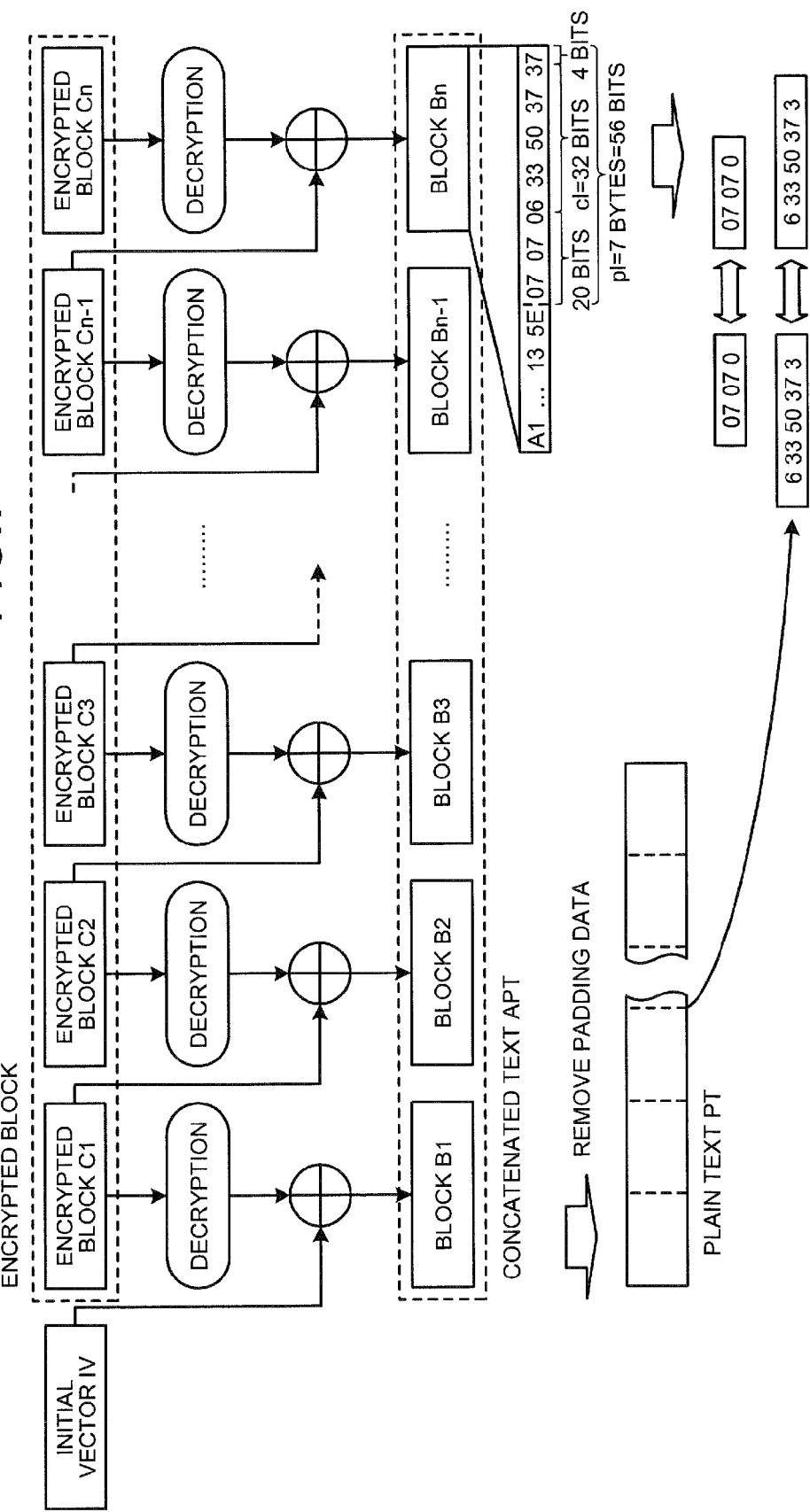
FIG. 7 is an explanatory view of a first specific example of tampering detection by the tampering detection apparatus 102.

FIG. 7 is an explanatory view of the first specific example of tampering detection by the tampering detection apparatus 102. In this case, it is assumed that the encrypted blocks C1 to Cn depicted in FIG. 6 transmitted from the information processing apparatus 101 are received by the tampering detection apparatus 102 without tampering. The tampering detection apparatus 102 detects the presence or absence of tampering of the received encrypted blocks C1 to Cn.

For example, the tampering detection apparatus 102 decrypts the blocks B1 to Bn from the encrypted blocks C1 to Cn. For example, if decrypting the first encrypted block C1 from the beginning, the tampering detection apparatus 102 decrypts the encrypted block C1 with the common key and calculates exclusive-OR with the initial vector IV to generate the block B1. If decrypting the i-th encrypted block Ci from the beginning, the tampering detection apparatus 102 decrypts the encrypted block Ci with the common key and calculates exclusive-OR with the encrypted block Ci-1 to generate the block Bi.

The tampering detection apparatus 102 extracts the padding length pl from the padding length area at the end of the generated final block Bn. The tampering detection apparatus 102 extracts 7 at the end of the padding pd and determines that the padding length pl is 7 [bytes].

The tampering detection apparatus 102 extracts the code corresponding to the padding length pl from the padding pd so as to determine whether the extracted padding length pl=7 [bytes] is correct. The code corresponding to the padding length is extracted as "07070". The code corresponding to the padding length is "07070", which is the same as the extracted code and therefore, the tampering detection apparatus 102 determines that the padding length pl=7 [bytes] is correct.

The tampering detection apparatus 102 extracts the CRC from the padding pd. Since the padding length pl is 7 [bytes], the tampering detection apparatus 102 determines that the CRC storage area length is 32 [bits]. The tampering detection apparatus 102 extracts the CRC "63350373" from the CRC storage area.

The tampering detection apparatus 102 determines and removes the last 7 [bytes] of data of the decrypted block Bn as the padding pd to thereby generate the plain text PT. The tampering detection apparatus 102 generates the 32 [bit] CRC from the plain text PT after the padding pd is removed.

The tampering detection apparatus 102 judges whether the extracted CRC and the generated CRC coincide to detect the presence or absence of tampering. If the plain text PT generated by the tampering detection apparatus 102 is the same as the plain text PT of the information processing apparatus 101, the CRCs generated from the respective plain texts PT are the same.

Since the encrypted blocks C1 to Cn have not been subject to tampering in this case, the CRC generated by the tampering detection apparatus 102 is the same as the CRC stored into the padding pd by the information processing apparatus 101. Therefore, the tampering detection apparatus 102 determines that the received encrypted blocks C1 to Cn have not been subject to tampering and that the plain text PT acquired by removing the padding pd in the tampering detection apparatus 102 has not changed from the plain text PT of the information processing apparatus 101.

A second specific example of tampering detection will be described with reference to FIGS. 8 and 9. In this example, the information processing apparatus 101 uses the CBC mode of the block cipher for encryption. The tampering detection apparatus 102 uses the CBC mode of the block cipher for decryption.

Figure 8:
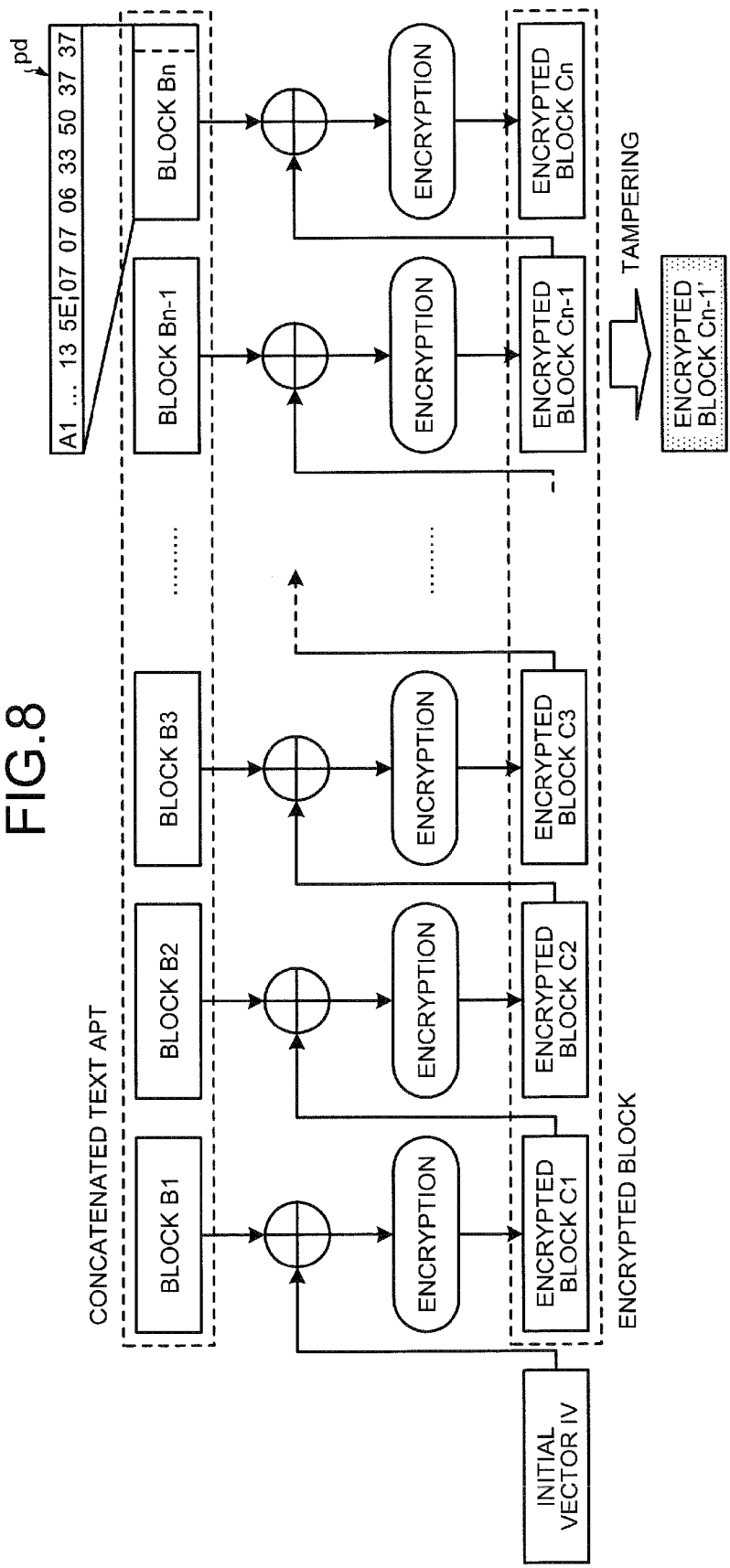
FIG. 8 is an explanatory view of a second specific example of encryption of the plain text PT by the information processing apparatus 101.

FIG. 8 is an explanatory view of a second specific example of encryption of the plain text PT by the information processing apparatus 101. In this example, as is the case with FIG. 6, the information processing apparatus 101 encrypts the plain text PT having a data length 9 [bytes] longer than a multiple of the block length bl. The information processing apparatus 101 transmits the encrypted blocks C1 to Cn to the tampering detection apparatus 102.

However, it is assumed that the transmitted encrypted blocks C1 to Cn are captured by an attacker on during transmission. The attacker tampers and changes the encrypted block Cn-1 to the encrypted block Cn-1'.

Figure 9:
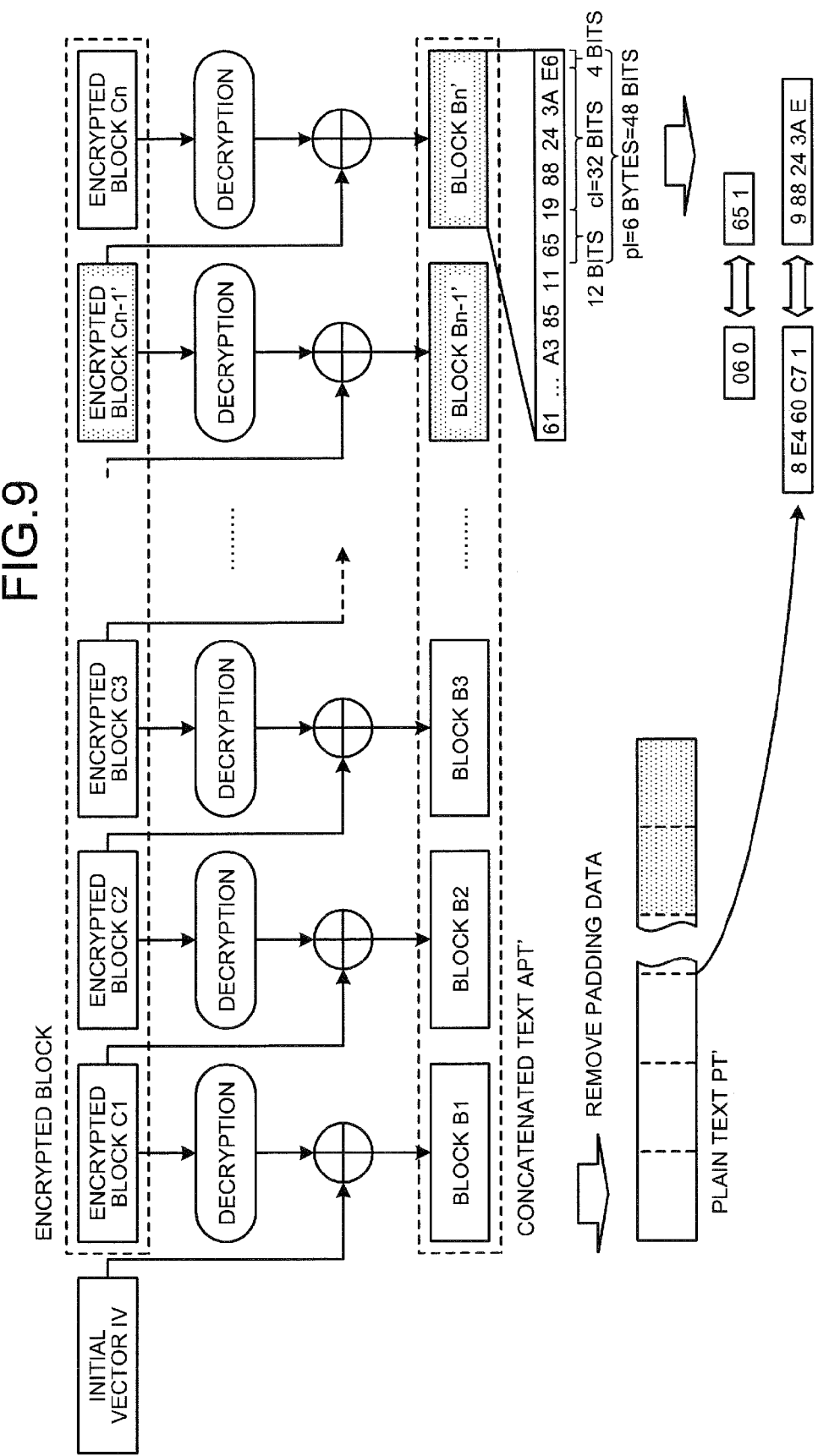
FIG. 9 is an explanatory view of a second specific example of tampering detection by the tampering detection apparatus 102.

FIG. 9 is an explanatory view of the second specific example of tampering detection by the tampering detection apparatus 102. It is assumed that the encrypted blocks C1 to Cn-2, Cn-1', and Cn depicted in FIG. 8 are received by the tampering detection apparatus 102. The tampering detection apparatus 102 detects the presence or absence of tampering of the received encrypted blocks C1 to Cn-2, Cn-1', and Cn.

Among the blocks decrypted by the tampering detection apparatus 102, blocks decrypted based on the tampered encrypted block Cn-1' are different from the blocks B1 to Bn of the information processing apparatus 101. In other words, blocks Bn-1' and Bn' that are different from the blocks Bn-1 and Bn are generated from the encrypted block Cn-1' and Cn from which the blocks Bn-1 and Bn should be generated by the decryption at the tampering detection apparatus 102. This causes a change in the contents of the padding pd.

The tampering detection apparatus 102 extracts the padding length pl from the padding length area at the end of the generated final block Bn'. The tampering detection apparatus 102 extracts 6 at the end and determines that the padding length pl is 6 [bytes].

The tampering detection apparatus 102 extracts the code corresponding to the padding length pl from the padding pd so as to determine whether the extracted padding length pl=6 [bytes] is correct. Since the padding pd is changed, "651" is extracted as the code corresponding to the padding length pl. Since the code corresponding to the padding length pl is "060" and different from the extracted code, the tampering detection apparatus 102 determines that the padding length pl=6 [bytes] is wrong.

As a result, the tampering detection apparatus 102 determines that the padding pd has been changed by tampering of the encrypted blocks. The tampering detection apparatus 102 determines that the contents of the plain text PT acquired by removing the padding pd by the tampering detection apparatus 102 have been changed consequent to tampering of the encrypted blocks without performing the coincidence judgment of the CRC.

The tampering is also detected with the coincidence judgment of the CRC. The tampering detection apparatus 102 extracts the CRC from the padding pd. Since the padding length pl is 6 [bytes], the tampering detection apparatus 102 determines that the CRC storage area length is 32 [bits]. The tampering detection apparatus 102 extracts a CRC' "651988243A" from the CRC storage area.

The tampering detection apparatus 102 determines and removes the last 6 [bytes] of data of the decrypted block Bn' as the padding pd to thereby generate plain text. Since the blocks Bn-1' and Bn' have been affected by tampering, a plain text PT' that is different from the plain text PT of the information processing apparatus 101 is generated. The tampering detection apparatus 102 generates a 32 [bit] CRC" from the plain text PT' after the padding pd is removed.

The tampering detection apparatus 102 judges whether the extracted CRC' and the generated CRC" coincide to detect the presence or absence of tampering. If the plain text PT' generated by the tampering detection apparatus 102 is the same as the plain text PT of the information processing apparatus 101, the CRCs generated from the respective plain texts are the same.

In this case, consequent to the tampering of the encrypted block Cn-1', the stored CRC is changed to the CRC'. The CRC" is generated from the plain text PT' that has changed consequent to the effect of the tampering of the encrypted block Cn-1'. Therefore, the CRC' stored in the padding pd is different from the CRC" generated by the tampering detection apparatus 102. Thus, the tampering detection apparatus 102 can determine that the contents of the plain text PT acquired by removing the padding pd in the tampering detection apparatus 102 are changed due to the effect of the tampering of the encrypted blocks.

A third specific example of tampering detection will be described with reference to FIGS. 10 and 11. In this example, the information processing apparatus 101 uses the CBC mode of the block cipher for encryption. The tampering detection apparatus 102 uses the CBC mode of the block cipher for decryption.

Figure 10:
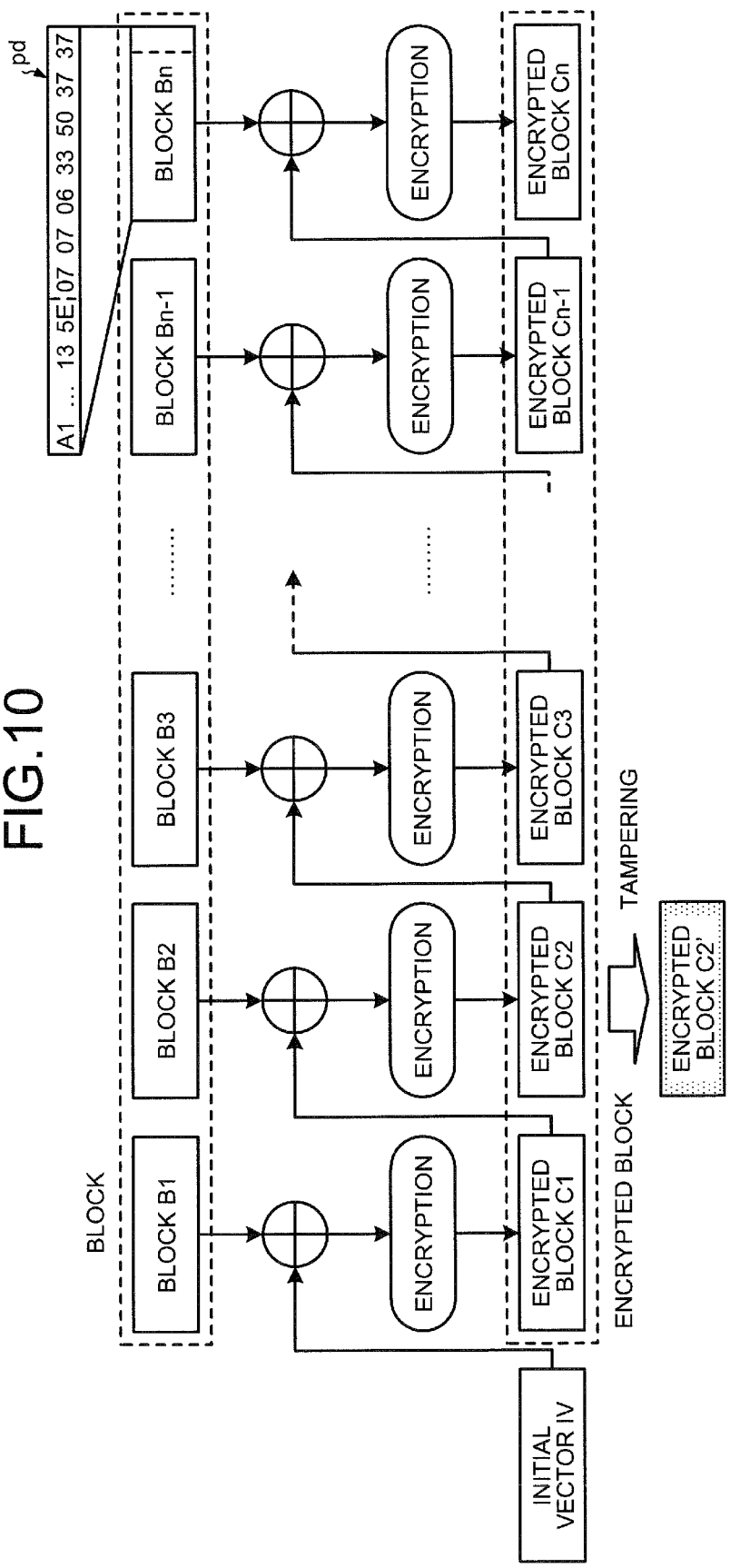
FIG. 10 is an explanatory view of a third specific example of encryption of the plain text PT by the information processing apparatus 101.

FIG. 10 is an explanatory view of a third specific example of encryption of the plain text PT by the information processing apparatus 101. In this example, as is the case with FIG. 6, the information processing apparatus 101 encrypts the plain text PT having a data length 9 [bytes] longer than a multiple of the block length bl. The information processing apparatus 101 transmits the encrypted blocks C1 to Cn to the tampering detection apparatus 102.

However, it is assumed that the transmitted encrypted blocks C1 to Cn are captured by an attacker during transmission. The attacker tampers and changes the encrypted block C2 to the encrypted block C2'.

Figure 11:
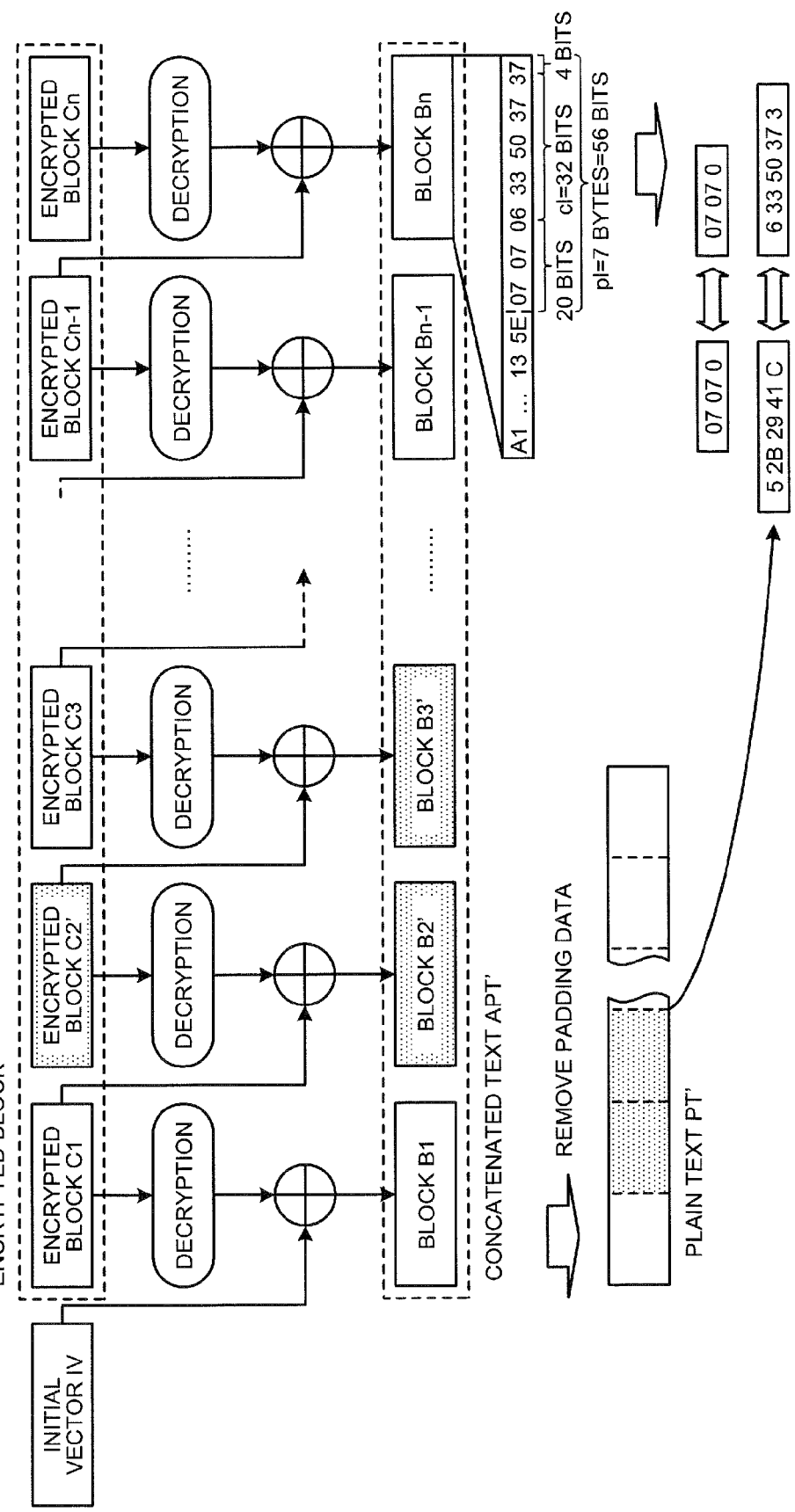
FIG. 11 is an explanatory view of a third specific example of tampering detection by the tampering detection apparatus 102.

FIG. 11 is an explanatory view of the third specific example of tampering detection by the tampering detection apparatus 102. It is assumed that the encrypted blocks C1, C2', C3 to Cn-1, and Cn depicted in FIG. 10 are received by the tampering detection apparatus 102. The tampering detection apparatus 102 detects the presence or absence of tampering of the received encrypted blocks C1, C2', C3 to Cn-1, and Cn.

Among the blocks decrypted by the tampering detection apparatus 102, blocks decrypted based on the tampered encrypted block C2' are different from the blocks B1 to Bn of the information processing apparatus 101. In other words, blocks B2' and B3', which are different from the blocks B2 and B3, are generated from the encrypted block C2' and C3 from which the blocks B2 and B3 should be generated by the decryption at the tampering detection apparatus 102. This causes no change in the contents of the padding pd.

The tampering detection apparatus 102 extracts the padding length pl from the padding length area at the end of the generated final block Bn. The tampering detection apparatus 102 extracts 7 at the end and determines that the padding length pl is 7 [bytes].

The tampering detection apparatus 102 extracts the code corresponding to the padding length pl from the padding pd so as to determine whether the extracted padding length pl=7 [bytes] is correct. Since the padding pd has not changed, the code corresponding to the padding length is extracted as "07070". The code corresponding to the padding length is "07070", which is the same as the extracted code and therefore, the tampering detection apparatus 102 determines that the padding length pl=7 [bytes] is correct.

The tampering detection apparatus 102 extracts the CRC from the padding pd. Since the padding length pl is 7 [bytes], the tampering detection apparatus 102 determines that the CRC storage area length is 32 [bits]. The tampering detection apparatus 102 extracts the CRC "63350373" from the CRC storage area.

The tampering detection apparatus 102 determines and removes the last 7 [bytes] of data of the decrypted block Bn as the padding pd to thereby generate plain text. Since the blocks B2' and B3' are affected by tampering, a plain text PT' different from the plain text PT of the information processing apparatus 101 is generated. The tampering detection apparatus 102 generates a 32 [bit] CRC' from the plain text PT' after the padding pd is removed.

The tampering detection apparatus 102 determines whether the extracted CRC and the generated CRC' coincide to detect the presence or absence of tampering. If the plain text PT' generated by the tampering detection apparatus 102 is the same as the plain text PT of the information processing apparatus 101, the CRCs generated from the respective plain texts are the same.

In this case, the CRC' is generated from the plain text PT' that has changed consequent to the tampering of the encrypted block C2'. Therefore, the CRC stored in the padding pd is different from the CRC' generated by the tampering detection apparatus 102. Thus, the tampering detection apparatus 102 can determine that the contents of the plain text PT acquired by removing the padding pd in the tampering detection apparatus 102 have changed consequent to tampering of the encrypted blocks.

Details of the padding concatenating process executed by the information processing apparatus 101 will be described with reference to FIG. 12.

Figure 12:
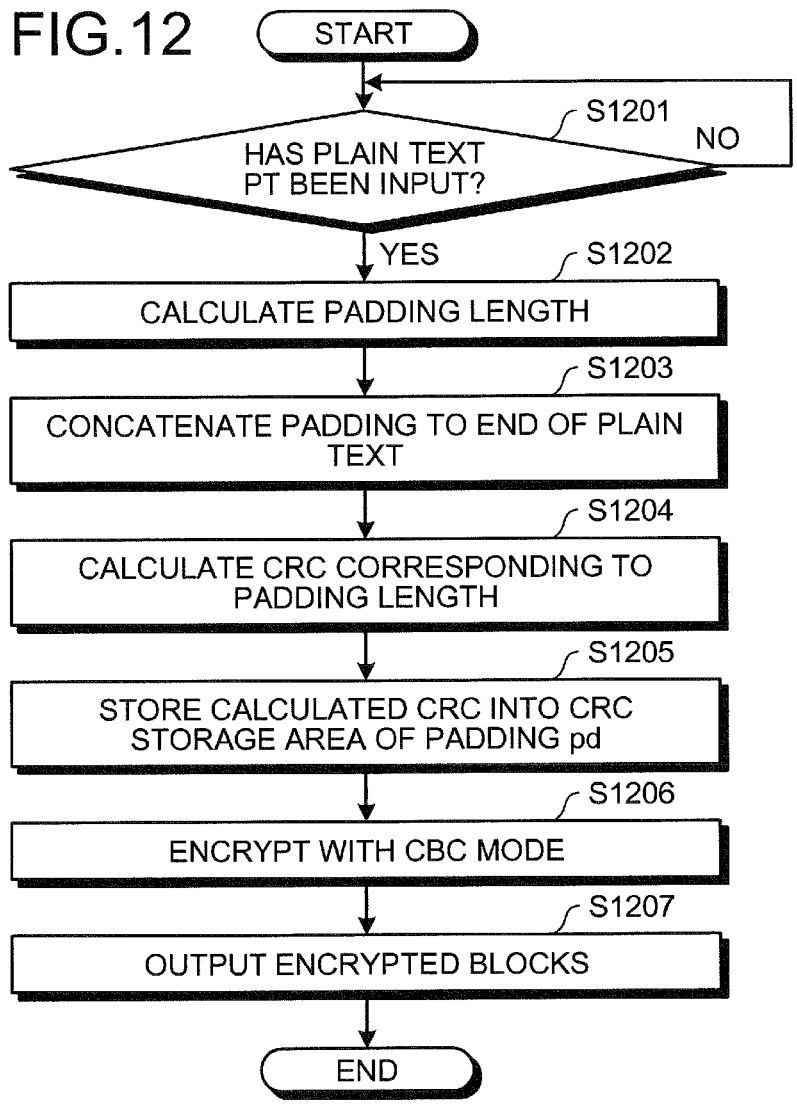
FIG. 12 is a flowchart of details of a padding concatenating process executed by the information processing apparatus 101.

FIG. 12 is a flowchart of details of the padding concatenating process executed by the information processing apparatus 101. The CPU 201 determines whether the plain text PT has been input (step S1201). If the plain text PT has not been input (step S1201: NO), the process returns to step S1201 and the CPU 201 waits for the input of the plain text PT. On the other hand, if the plain text PT has been input (step S1201: YES), the process goes to step S1202.

The CPU 201 calculates the padding length pl of the padding pd to be concatenated to the input plain text PT (step S1202). The CPU 201 concatenates to the end of the plain text PT, the padding pd having the calculated padding length pl (step S1203).

The CPU 201 calculates the CRC corresponding to the calculated padding length pl (step S1204). The CPU 201 stores the calculated CRC into the CRC storage area of the padding pd (step S1205).

The CPU 201 encrypts the concatenated text APT storing the CRC with the CBC mode of the block cipher on the basis of the block length bl (step S1206). The CPU 1201 outputs the encrypted blocks after the encryption (step S1207) and terminates the padding concatenating process.

As a result, the information processing apparatus 101 can create the padding pd that includes the code, which indicates the padding length pl, at the end and that includes the code calculated from the plain text PT in the storage area. As a result, if the padding pd has a remaining area other than the padding length area and the storage area, the information processing apparatus 101 can create the padding pd to include in the remaining area, the code corresponding to the padding length pl. The information processing apparatus 101 can concatenate the created padding pd to the input plain text PT to create the concatenated text APT.

Details of the tampering detection process executed by the tampering detection apparatus 102 will be described with reference to FIG. 13.

Figure 13:
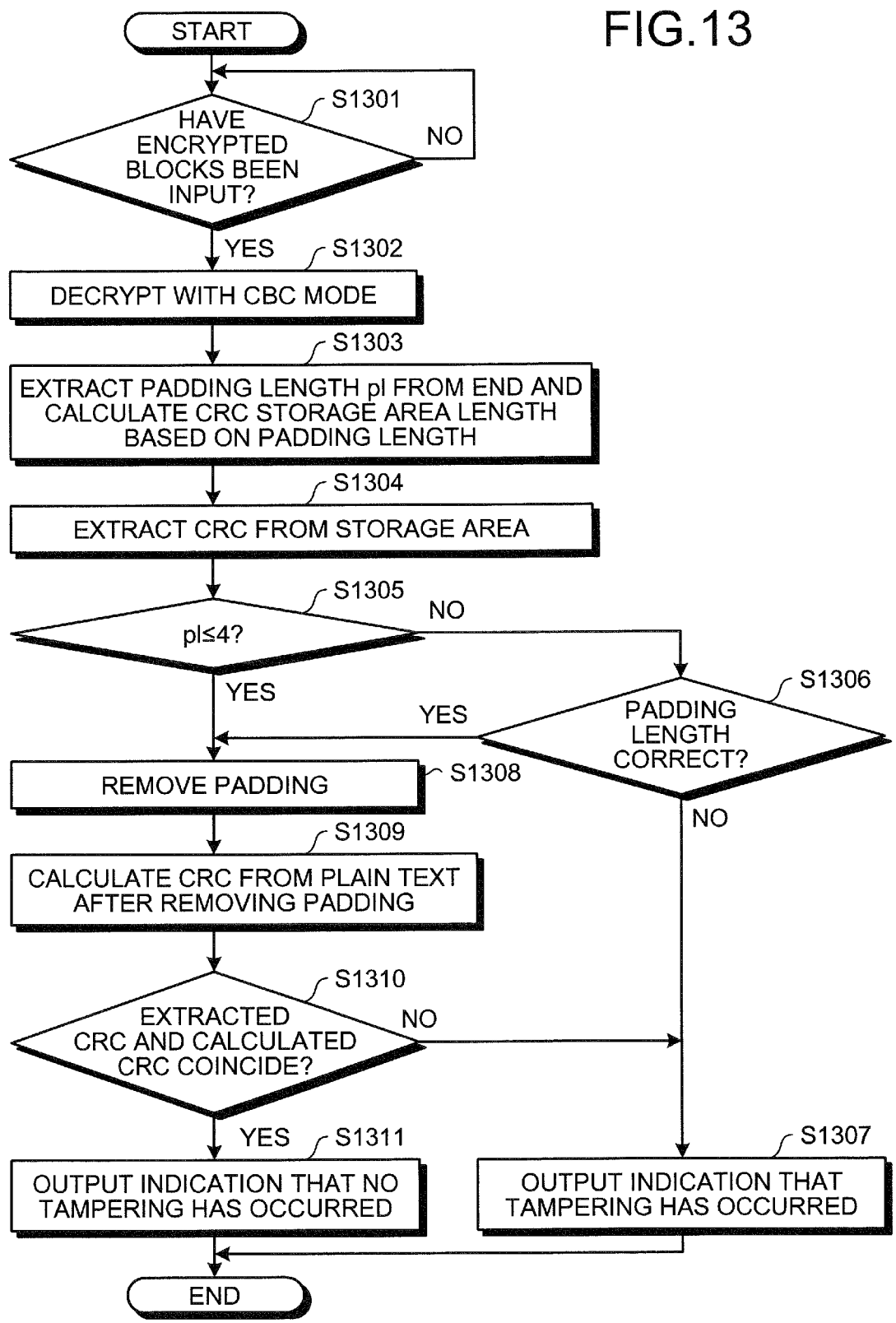
FIG. 13 is a flowchart of details of a tampering detection process executed by the tampering detection apparatus 102.

FIG. 13 is a flowchart of details of the tampering detection process executed by the tampering detection apparatus 102. The CPU 201 determines whether encrypted blocks have been input (step S1301). If the encrypted blocks have not been input (step S1301: NO), the process returns to step S1301 and the CPU 201 waits for the input of the encrypted blocks. On the other hand, if the encrypted blocks have been input (step S1301: YES), the process goes to step S1302.

The CPU 201 decrypts the plain text from the encrypted blocks with the CBC mode of the block cipher (step S1302). The CPU 201 extracts the padding length pl from the end and calculates the CRC storage area length based on the padding length pl (step S1303). The CPU 201 extracts the CRC from the storage area (step S1304).

The CPU 201 determines if the padding length pl is equal to or less than 4 [bytes] (step S1305). If the padding length pl is equal to or less than 4 [bytes] (step S1305: YES), the process goes to step S1308.

On the other hand, if the padding length pl is not equal to or less than 4 [bytes] (step S1305: NO), the CPU 201 determines whether the padding length pl is correct (step S1306). If the padding length pl is correct (step S1306: YES), the process goes to step S1308.

On the other hand, if the padding length pl is wrong (step S1306: NO), the CPU 201 determines that tampering has occurred and outputs the determination result (step S1307) and terminates the tampering detection process.

At step S1308, the CPU 201 removes the padding pd from the decrypted plain text (step S1308). The CPU 201 calculates the CRC from the plain text after removing the padding (step S1309).

The CPU 201 judges whether the CRC extracted at step S1304 is coincides with the CRC calculated at step S1309 (step S1310). If coincident (step S1310: YES), the CPU 201 judges that no tampering has occurred, outputs the decrypted plain text (step S1311), and terminates the tampering detection process.

On the other hand, if not coincident (step S1310: NO), the CPU 201 judges that tampering has occurred, outputs the determination result (step S1307), and terminates the tampering detection process.

As a result, if the padding pd includes the code corresponding to the padding length pl, the tampering detection apparatus 102 can determine whether the padding length pl is correct, thereby determining whether the effect of tampering of the encrypted blocks extends to the padding pd.

The tampering detection apparatus 102 judges whether the code calculated from the plain text PT of the information processing apparatus 101 included in the padding pd and the code calculated from the plain text acquired by the tampering detection apparatus 102 coincide. Therefore, the tampering detection apparatus 102 can determine whether the plain text acquired by the tampering detection apparatus 102 has changed from the plain text PT of the information processing apparatus 101 consequent to tampering of the encrypted blocks.

As described above, the information processing apparatus 101 calculates the padding length pl of the padding concatenated to the plain text PT and then calculates the storage area length cl of the code calculated from the plain text PT within a range of the padding length pl. This enables the code calculated from the plain text PT to be generated of a data length that can be stored in the padding pd. As a result, since the storage of the generated code calculated from the plain text PT into the padding pd does not increase the data length of the padding pd, the data length of the concatenated text APT can be prevented from increasing and a amount of used resources can be reduced.

The tampering detection apparatus 102 judges whether the code calculated from the plain text acquired by decryption and the code calculated from the plain text PT stored in the padding pd coincide. As a result, it can be detected that the plain text has changed consequent to tampering of the encrypted blocks.

The information processing apparatus 101 ensures the padding length area at the end of the padding pd when calculating the storage area. As a result, based on the data length indicated by the code of the padding length area at the end, the tampering detection apparatus 102 can remove the padding pd from the concatenated text APT for which tampering is not detected, thereby acquiring the plain text PT that is the same as the plain text PT of the information processing apparatus 101.

The information processing apparatus 101 generates the padding length area length ll to be the shortest data length capable of indicating the block length bl. As a result, the code indicating the padding length pl can be stored in a minimum necessary data length.

The information processing apparatus 101 generates the padding pd to a minimum data length necessary for encrypting the plain text PT. As a result, an increase in the amount of transmission data due to concatenation of the padding pd can be minimized.

The information processing method and the tampering detection method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

An aspect of the present embodiment produces an effect that detection of tampering of overall plain text can be achieved without increasing used resources.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a hardware processor configured to:
identify a data length that is longer than a data length of plain text data and that is a multiple of a predetermined block length;
calculate a data length difference of the data length of the plain text and the identified data length;
generate a first code that indicates the calculated data length difference;
generate a second code that is calculated from the plain text data and is of a data length that is within a remaining data length acquired by subtracting a data length of the generated first code from the data length difference;
create padding that includes the generated second code, has the first code at an end, and is of a length equivalent to the data length difference;
concatenate the created padding to an end of the plain text data to generate concatenated data; and
output the concatenated data.

2. The information processing apparatus according to claim 1, the processor further configured to
encrypt on a basis of the predetermined block length, the concatenated data by using a key used for encryption and decryption in common, wherein
the processor outputs encrypted concatenated data that has been encrypted on the basis of the predetermined block length.

3. The information processing apparatus according to claim 1, wherein
the processor generates the first code to have a shortest data length capable of indicating the predetermined block length.

4. The information processing apparatus according to claim 1, wherein
the processor identifies a shortest data length among a group of data lengths that are longer than the data length of the plain text data and that are multiples of the predetermined block length.

5. The information processing apparatus according to claim 1, wherein
the processor generates the second code that is calculated from the plain text data and is of the remaining data length acquired by subtracting the data length of the first code from the data length difference, and
the processor creates the padding that has the first code at the end and starts with the second code.

6. The information processing apparatus according to claim 1, wherein
the processor, when a predetermined data length indicating the maximum length of the second code is shorter than the remaining data length acquired by subtracting the data length of the first code from the data length difference, generates the second code that is calculated from the plain text data and of the predetermined data length, and
the processor creates the padding that has the first code at the end, the second code made adjacent to a beginning of the first code, and is the length equivalent to the data length difference.

7. The information processing apparatus according to claim 6, the processor further configured to
generate a third code that identifies the first code and is of a remaining data length acquired by subtracting the data length of the first code and the predetermined data length from the data length difference, wherein
the processor creates the padding that has the first code at the end, the second code made adjacent to the beginning of the first code, and the third code made adjacent to a beginning of the second code.

8. The information processing apparatus according to claim 1, wherein the second code is a cyclic redundancy check code calculated by a cyclic redundancy check code generation function.

9. The information processing apparatus according to claim 1, wherein the second code is a parity code acquired from the plain text data.

10. A tampering detection apparatus comprising:
a hardware processor configured to:
receive input of encrypted data acquired by encrypting plain text data on a basis of a predetermined block length;
generate from the received encrypted data, decrypted data that is decrypted by using a key used for encryption and decryption in common;
extract a first code from a first area that is at an end of the decrypted data and stores a data length of padding;
determine based on a data length indicated by the extracted first code, a second area that is of the decrypted data and stores a code calculated from the plain text data; extract a second code from the determined second area;
extract a third code from a third area of the decrypted data, acquired by removing an ending area of the decrypted data, and having a data length indicated by the first code;
generate a fourth code that is calculated from the extracted third code and of a same data length as the data length of the second code;
judge whether the generated fourth code and the second code coincide; and
output a judgment result.

11. The tampering detection apparatus according to claim 10, wherein
the processor determines, as the second area, an area in the decrypted data adjacent to a beginning of the first area and having a remaining data length that is acquired by subtracting the data length of the first area from the data length indicated by the first code.

12. The tampering detection apparatus according to claim 10, wherein
the processor, when a predetermined data length indicating the maximum length of the second code is shorter than a remaining data length acquired by subtracting the data length of the first code from the data length indicated by the first code, determines as the second area, an area in the decrypted data adjacent to a beginning of the first area and having the predetermined data length.

13. The tampering detection apparatus according to claim 12, the processor further configured to
extract a fifth code from a fourth area storing a code that identifies the first code, wherein
the processor determines, as the fourth area, an area in the decrypted data adjacent to the beginning of the second area and having a remaining data length acquired by subtracting the data length of the first code and the predetermined data length from the data length indicated by the first code, wherein
the processor extracts the fifth code from the determined fourth area, and
the processor judges whether a code identified by the extracted fifth code and the first code coincide.

14. The tampering detection apparatus according to claim 11, wherein the fourth code is a cyclic redundancy check code calculated by a cyclic redundancy check code generation function acquired from the third code.

15. The tampering detection apparatus according to claim 11, wherein the fourth code is a parity code acquired from the third code.

16. An information processing method executed by a computer, the information processing method comprising:
identifying a data length that is longer than a data length of plain text data and that is a multiple of a predetermined block length;
calculating a data length difference of the data length of the plain text and the identified data length;
generating a first code that indicates the calculated data length difference;
generating a second code that is calculated from the plain text data and is of a data length that is within a remaining data length acquired by subtracting a data length of the generated first code from the data length difference;
creating padding that includes the generated second code, has the first code at an end, and is of a length equivalent to the data length difference;
concatenating the created padding to an end of the plain text data to generate concatenated data; and
outputting the concatenated data.

17. A tampering detection method executed by a computer, the tampering detection method comprising:
receiving input of encrypted data acquired by encrypting plain text data on a basis of a predetermined block length;
generating from the received encrypted data, decrypted data that is decrypted by using a key used for encryption and decryption in common;
extracting a first code from a first area that is at an end of the decrypted data and stores a data length of padding;
determining based on a data length indicated by the extracted first code, a second area that is of the decrypted data and stores a code calculated from the plain text data;
extracting a second code from the determined second area;
extracting a third code from a third area of the decrypted data, acquired by removing an ending area of the decrypted data, and having a data length indicated by the first code;
generating a fourth code that is calculated from the extracted third code and of a same data length as the data length of the second code;
judging whether the generated fourth code and the second code coincide; and
outputting a judgment result.

18. A non-transitory computer-readable recording medium storing an information processing program that causes a computer to execute a process comprising:
identifying a data length that is longer than a data length of plain text data and that is a multiple of a predetermined block length;
calculating a data length difference of the data length of the plain text and the identified data length;
generating a first code that indicates the calculated data length difference;
generating a second code that is calculated from the plain text data and is of a data length that is within a remaining data length acquired by subtracting a data length of the generated first code from the data length difference;
creating padding that includes the generated second code, has the first code at an end, and is of a length equivalent to the data length difference;
concatenating the created padding to an end of the plain text data to generate concatenated data; and
outputting the concatenated data.

19. A non-transitory computer-readable recording medium storing a tampering detection program that causes a computer to execute a process comprising:
receiving input of encrypted data acquired by encrypting plain text data on a basis of a predetermined block length;
generating from the received encrypted data, decrypted data that is decrypted by using a key used for encryption and decryption in common;
extracting a first code from a first area that is at an end of the decrypted data and stores a data length of padding;

determining based on a data length indicated by the extracted first code, a second area that is of the decrypted data and stores a code calculated from the plain text data;

extracting a second code from the determined second area;

extracting a third code from a third area of the decrypted data, acquired by removing an ending area of the decrypted data, and having a data length indicated by the first code;

generating a fourth code that is calculated from the extracted third code and of a same data length as the data length of the second code;

judging whether the generated fourth code and the second code coincide; and outputting a judgment result.

* * * * *